(12) United States Patent
Pettersson et al.

(10) Patent No.: US 12,267,511 B2
(45) Date of Patent: Apr. 1, 2025

(54) COMPACT NETWORK ABSTRACTION LAYER (NAL) UNIT HEADER

(71) Applicant: Telefonaktiebolaget LM Ericsson (publ), Stockholm (SE)

(72) Inventors: Martin Pettersson, Vallentuna (SE); Rickard Sjöberg, Stockholm (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 190 days.

(21) Appl. No.: 17/620,000

(22) PCT Filed: May 8, 2020

(86) PCT No.: PCT/SE2020/050476
§ 371 (c)(1),
(2) Date: Dec. 16, 2021

(87) PCT Pub. No.: WO2020/256613
PCT Pub. Date: Dec. 24, 2020

(65) Prior Publication Data
US 2022/0303558 A1    Sep. 22, 2022

Related U.S. Application Data

(60) Provisional application No. 62/863,363, filed on Jun. 19, 2019.

(51) Int. Cl.
*H04N 19/169*    (2014.01)
*H04N 19/184*    (2014.01)
(Continued)

(52) U.S. Cl.
CPC ......... *H04N 19/188* (2014.11); *H04N 19/184* (2014.11); *H04N 19/1887* (2014.11); *H04N 19/30* (2014.11); *H04N 19/70* (2014.11)

(58) Field of Classification Search
CPC ............... H04N 19/184; H04N 19/188; H04N 19/1887; H04N 19/30; H04N 19/463; H04N 19/70
See application file for complete search history.

(56) References Cited

U.S. PATENT DOCUMENTS

2012/0229602 A1\* 9/2012 Chen ..................... H04N 19/597
348/43
2020/0288174 A1\* 9/2020 Wenger ................ H04N 19/188

OTHER PUBLICATIONS

Wenger et al. "AHG17: On NAL unit header design for VVC", 13. JVET meeting; Jan. 9, 2019-Jan. 18, 2019; Marrakech; (the Joint Video Exploration Team of ISO/IEC JTC1/SC29/WG11 and ITU-T SG 16); JVET-M0520; Jan. 3, 2019 (Year: 2019).\*

(Continued)

*Primary Examiner* — Maria E Vazquez Colon
(74) *Attorney, Agent, or Firm* — Rothwell, Figg, Ernst & Manbeck, P.C.

(57) ABSTRACT

There are provided mechanisms performed by a video decoder. The method comprises obtaining a network abstraction layer (NAL) unit having a particular NAL unit type. The obtained NAL unit comprises a NAL unit header. The NAL unit header of the obtained NAL unit comprises at least a first part comprising N bits. The method comprises obtaining NAL unit header (NUH) extension information that indicates whether or not the NAL unit header further comprises a second part that comprises M bits. The method comprises determining, based on the NUH extension information, a NAL unit type value specifying the particular NAL unit type of the obtained NAL unit.

17 Claims, 10 Drawing Sheets

(51) Int. Cl.
   *H04N 19/30*    (2014.01)
   *H04N 19/70*    (2014.01)

(56) References Cited

OTHER PUBLICATIONS

Wenger et al. "AHG17: On NAL unit header design for VVC", 13. JVET meeting; Jan. 9, 2019-Jan. 18, 2019; Marrakech; (the Joint Video Exploration Team of ISO/IEC JTC1/SC29/WG11 and ITU-T SG 16); Document: JVET-M0520 (Year: 2019).*

International Search Report and Written Opinion dated Jul. 1, 2020 in International Application No. PCT/SE2020/050476 (14 pages total).

Wenger, S. et al., "AHG17: On NAL unit header design for VVC", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0520 (4 pages total).

Hannuksela, M.M et al., "AHG17: On the first byte of the NAL unit header", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0067 (3 pages total).

Kang, J.W et al., "Simple NAL Unit Header for HEVC", Joint Collaborative Team on Video Coding (JCT-VC) of ITU-T SG16 WP3 and ISO/IEC JTC1/SC29/WG11, 8th Meeting: San José, CA, USA, Feb. 1-10, 2012, Document: JCTVC-H0410 (5 pages total).

Pettersson, M et al., "AHG17: Compact NAL unit header", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0237 (9 pages total).

Bross, B. et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v2 (362 pages total).

Bross, B. et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7 (384 pages total).

\* cited by examiner

COMPACT NETWORK ABSTRACTION LAYER (NAL) UNIT HEADER

CROSS REFERENCE TO RELATED APPLICATIONS

This application is a 35 U.S.C. § 371 National Phase Entry of PCT/SE2020/050476, filed May 8, 2020, which claims priority to U.S. provisional patent application No. 62/863,363, filed Jun. 19, 2019. The above identified applications are incorporated by this reference.

TECHNICAL FIELD

This disclosure relates to video coding and decoding.

BACKGROUND

1.1 HEVC and VVC

High Efficiency Video Coding (HEVC) is a block-based video codec standardized by ITU-T and MPEG. The HEVC video codec utilizes both temporal and spatial prediction. Spatial prediction is achieved using intra (I) prediction from within a current picture. Temporal prediction is achieved using uni-directional (P) or bi-directional (B) inter prediction on block level from previously decoded reference pictures. In the encoder, the difference between the original pixel data and the predicted pixel data, referred to as the residual, is transformed into the frequency domain, quantized and then entropy coded before being transmitted together with necessary prediction parameters, such as, for example, prediction mode and motion vectors, which are also entropy coded. The decoder performs entropy decoding, inverse quantization and inverse transformation to obtain the residual, and then adds the residual to an intra or inter prediction to reconstruct a picture.

MPEG and ITU-T are working on the successor to HEVC within the Joint Video Exploratory Team (WET). The name of this video codec under development is Versatile Video Coding (VVC). The current VVC draft specification, at the time of writing, is found in JVET document WET-N1001-v7.

1.2 Components

A video sequence consists of a series of pictures where each picture consists of one or more components. Each component can be described as a two-dimensional rectangular array of sample values. It is common that a picture in a video sequence consists of three components: one luma component Y, where the sample values are luma values, and two chroma components Cb and Cr, where the sample values are chroma values. It is also common that the dimensions of the chroma components are smaller than the luma components by a factor of two in each dimension to save bits in compression. For example, the size of the luma component of an HD picture is 1920×1080 and the chroma components each have the dimension of 960×540. Components are sometimes referred to as color components.

1.3 Blocks and Units

A block is one two-dimensional array of sample values (or "samples" for short). In video coding, each component is split into blocks and the coded video bitstream consists of a series of coded blocks. It is common in video coding that the picture is split into units that cover a specific area of the picture. Each unit consists of all blocks from all components that make up that specific area and each block belongs fully to one unit. The macroblock in H.264 and the coding unit (CU) in HEVC are examples of units.

A block can alternatively be defined as a two-dimensional array to which a transform used in coding is applied. These blocks are known as "transform blocks." Alternatively, a block can be defined as a two-dimensional array to which a single prediction mode is applied. These blocks are called "prediction blocks." In this disclosure, the word block is not tied to one of these definitions but that the descriptions herein can apply to either definition

1.4 NAL Units

Both HEVC and VVC define a Network Abstraction Layer (NAL). All the data (i.e., both Video Coding Layer (VCL) data or non-VCL data) in HEVC and VVC is encapsulated in NAL units. A VCL NAL unit contains data that represents sample values. A non-VCL NAL unit contains additional associated data such as parameter sets and supplemental enhancement information (SEI) messages. The NAL unit in HEVC and VVC begins with a NAL unit header that specifies the NAL unit type of the NAL unit, the layer ID of the layer, and the temporal ID of the sub-layer to which the NAL unit belongs. The NAL unit type identifies the type of data that is carried in the NAL unit.

In HEVC, a forbidden_zero_bit is signaled to avoid MPEG-2 stream layer packetized elementary stream (PES) start code emulation and the NAL unit type is transmitted in the nal_unit_type codeword in the NAL unit header. The syntax elements for the NAL unit header in HEVC is shown in Table 1, and the syntax elements for the NAL unit header in the current version of the VVC draft specification, JVET-N1001-v7, is shown in Table 2.

| HEVC NAL unit header syntax | |
|---|---|
| | Descriptor |
| nal_unit_header() { | f(1) |
|   forbidden_zero_bit | u(6) |
|   nal_unit_type | u(6) |
|   nuh_layer_id | u(3) |
|   nuh_temporal_id_plus1 | |
| } | |

TABLE 2

| NAL unit header syntax for current version of VVC draft specification | |
|---|---|
| | Descriptor |
| nal_unit_header() { | u(1) |
|   zero_tid_required_ flag | u(3) |
|   nuh_temporal_id_plus1 | u(4) |
|   nal_unit_type_lsb | u(7) |
|   nuh _layer_id | u(1) |
|   nuh_reserved_zero_bit | |
| } | |

For VVC, there is a method to avoid MPEG-2 stream layer PES start code emulation in a more efficient way than in HEVC. MPEG-2 PES start codes consist of a 24-bit prefix (0x000001) and an 8-bit stream_id specified in Table 2-22 of ITU-T Rec. H.222.0|ISO/IEC 13818-1, depicted in Table 3. stream_id values are in the range of 10111100b to 11111111b as can be seen in Table 3.

TABLE 3

MPEG-2 PES stream_id assignments
Table 2-22 Stream_id assignments

| Stream_id | Note | stream coding |
|---|---|---|
| '1011 1100' | 1 | psogram_stream_map |
| '1011 1101' | 2, 9, 10 | private_stream_ 1 |
| '1011 1110' | | padding_stream |
| '1011 1111' | 3 | private_stream_ 1 |
| '110x xxxx' | | ISO/IEC 13818-3 or ISO/IEC 11172-3 or ISO/IEC 13818-7 or ISO/IEC 14496-3 or ISO/IEC 23008-3 audio stream number 'x xxxx' |
| '110x xxxx' | | Rec. ITU-T H.262 1 ISO/IEC 13818-2, ISO/TEC 11172-2, ISO/IEC 14496-2 Rec. ITU-T H.254 \| ISO/IEC 14496-10 or Rec ITU-T H.265 \| ISO/IEC 23008-2 video stream number 'xxxx' |
| '111 0000' | 3 | ECM_stream |
| '111 0001' | 3 | EMM_stream |
| '111 0010' | 5 | Rac. ITU-T H.222.0 \| ISO/IEC 13818-1 Annex A or ISO/IEC 13818-6_DSMCC_stream |
| '111 0011' | 2 | ISO/IEC_13522_stream |
| '111 0100' | 6 | Rec. ITU-T H.222.1 type A |
| '111 0101' | 6 | Rec. ITU-T H.222 1 type B |
| '111 0110' | 6 | Rac. ITU-T H 222.1 type C |
| '111 0111' | 6 | Rec. ITU-T H.222.1 type D |
| '111 1000' | 6 | Rec. ITU-T H.222.1 type E |
| '111 1001' | 7 | ancillary_stream |
| '111 1010' | | ISO/IEC 14496-1 _SL-packetized_streams |
| '111 11011' | | ISO/IEC 14496- 1_FesMux_stream |
| '111 1100' | | metadata stream |
| '111 1101' | 8 | extended_stream_id |
| '111 1110' | | reserved data stream |
| '111 1111' | 4 | program_ stream_directory |

VVC has, like MPEG PES, a start code with a 24-bit prefix (0x000001) before the NAL unit. In the current version of VVC, a zero_tid_required_flag is signaled as the first bit of the NAL unit header. When this flag is equal to 1, nuh_temporal_id_plus1 must be equal to 1. The zero_tid_required_flag (ztrf) can then be used together with nal_unit_type_lsb (nut_lsb) to derive the NAL unit type according to:

NalUnitType=(zrtf<<4)+nal_unit_type_lsb.

This means that a NAL unit having a NAL unit type in the upper half of the set of NAL unit type values cannot have a non-zero temporal ID. However, many of the NAL unit types in VVC are anyway required to have temporal ID equal to 0, e.g. SPS and the different TRAP picture types. By ordering the NAL unit types in a specific order it is thus possible to save 1 bit, while still avoiding MPEG-2 stream layer PES start code emulation.

A decoder or bitstream parser can determine how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The NAL unit type indicates and defines how the NAL unit should be parsed and decoded. A VCL NAL unit provides information about the picture type of the current picture. The NAL unit types of the current version of the VVC draft specification are shown in Table 4.

The decoding order is the order in which NAL units shall be decoded, which is the same as the order of the NAL units within the bitstream. The decoding order may be different from the output order, which is the order in which decoded pictures are to be output, such as for display, by the decoder.

TABLE 4

NAL unit types in the current version of the VVC draft specification

| NalUnitType | Name of NalUnitType | Content of NAL unit and RBSP syntax structure | NAL unit type class |
|---|---|---|---|
| 0 | PPS_NUT | Picture parameter set pic_parameter_set_rbsp() | non-VCL |
| 1 | AUD_NUT | Access unit delimiter access_unit_delimiter_rbsp() | non-VCL |
| 2 3 | PREFIX_SEI_NUT SUFFIX_SEI_NUT | Supplemental enhancement information sei_rbsp() | non-VCL |
| 4 | APS_NUT | Adaptation parameter set adaptation_parameter_set_rbsp() | non-VCL |
| 5..7 | RSV_NVCL5.. RSV_NVCL7 | Reserved | non-VCL |

TABLE 4-continued

NAL unit types in the current version of the VVC draft specification

| NalUnitType | Name of NalUnitType | Content of NAL unit and RBSP syntax structure | NAL unit type class |
|---|---|---|---|
| 8 | TRAIL_NUT | Coded slice of a non-STSA trailing picture slice_layer_rbsp() | VCL |
| 9 | STSA_NUT | Coded slice of an STSA picture slice_layer_rbsp() | VCL |
| 10 | RADL_NUT | Coded slice of a RADL picture slice_layer_rbsp() | VCL |
| 11 | RASL_NUT | Coded slice of a RASL picture slice_layer_rbsp() | VCL |
| 12..15 | RSV_VCL_12.. RSV_VCL_15 | Reserved non-IRAP VCL NAL unit types | VCL |
| 16 | DPS_NUT | Decoding parameter set decoding_parameter_set_rbsp() | non-VCL |
| 17 | SPS_NUT | Sequence parameter set seq_parameter_set_rbsp() | non-VCL |
| 18 | EOS_NUT | End of sequence end_of_seq_rbsp() | non-VCL |
| 19 | EOB_NUT | End of bitstream end_of_bitstream_rbsp() | non-VCL |
| 20 | VPS_NUT | Video parameter set video_parameter_set_rbsp() | non-VCL |
| 21..23 | RSV_NVCL21.. RSV_NVCL23 | Reserved | non-VCL |
| 24 25 | IDR_W_RADL IDR_N_LP | Coded slice of an IDR picture slice_layer_rbsp() | VCL |
| 26 | CRA_NUT | Coded slice of a CRA picture slice_layer_rbsp() | VCL |
| 27 | GRA_NUT | Coded slice of a gradual random access picture slice_layer_rbsp() | VCL |
| 28..31 | UNSPEC28.. UNSPEC31 | Unspecified | non-VCL |

1.5 Intra Random Access Point (IRAP) Pictures and the Coded Video Sequence (CVS)

For single layer coding in HEVC and the current VVC draft specification, an access unit (AU) is the coded representation of a single picture. An AU may consist of several video coding layer (VCL) NAL units as well as non-VCL NAL units. An AU may optionally start with an access unit delimiter (AUD) which indicates the start of the AU and the type of the slices allowed in the picture, i.e. I, I-P or I-P-B.

An intra random access point (TRAP) picture in HEVC is a picture that does not refer to any pictures other than itself for prediction in its decoding process. The first picture in the bitstream in decoding order in HEVC must be an TRAP picture but an TRAP picture may additionally also appear later in the bitstream. HEVC specifies three types of TRAP pictures, the broken link access (BLA) picture, the instantaneous decoder refresh (IDR) picture and the clean random access (CRA) picture.

A coded video sequence (CVS) in HEVC is a series of AUs starting at an IRAP AU up to, but not including the next TRAP AU in decoding order.

IDR pictures always start a new CVS. An IDR picture may have associated random access decodable leading (RADL) pictures. An IDR picture does not have associated RASL pictures.

BLA pictures in HEVC also start a new CVS and have the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft specification, a CVS is started at a CVS start (CVSS) access unit, which may contain an IRAP picture, i.e, an IDR or a CRA picture, or a gradual random access (GRA) picture.

GRA pictures are essentially used for random access in bitstreams encoded for low-delay coding where a full TRAP picture would cause too much delay. A GRA picture may use gradual intra refresh that updates the video picture by picture where each picture is only partially intra coded. It is signaled with the GRA picture when the video is fully refreshed and ready for output, given that the bitstream was tuned into at the GRA picture. A GRA may start a CVS.

1.6 Parameter Sets

HEVC and VVC specify three types of parameter sets: 1) the picture parameter set (PPS), 2) the sequence parameter set (SPS), and 3) the video parameter set (VPS). The PPS contains data that is common for one or more pictures, the SPS contains data that is common for a coded video sequence (CVS), and the VPS contains data that is common for multiple CVSs.

The current version of VVC also specifies two additional parameter sets: the adaptation parameter set (APS) and the decoder parameter set (DPS). APS carries parameters needed for the adaptive loop filter (ALF) tool and the luma mapping and chroma scaling (LMCS) tool. DPS specifies information that may not change during the decoding session and may be good for the decoder to know about, e.g. the maximum number of allowed sub-layers. The information in DPS is not necessary for operation of the decoding process.

SUMMARY

Certain challenges exist. For example, in HEVC and in the current version of the VVC draft specification, the NAL unit header is signaled with two bytes. In the current version of the VVC draft specification, the second byte of the NAL unit header comprises a layer ID and a bit that is reserved for future use. It is asserted that in most mainstream usages of VVC, the layer ID will be 0 and the future reserved bit will not be used. Thus, in the mainstream usage of VVC the second byte will contain zero bits. Since the NAL unit header is frequently signaled in the bitstream (i.e., once for each VCL and non-VCL NAL unit which may be several times per picture), the second byte becomes in the mainstream usage of VVC an unnecessary additional bit cost.

It can also be observed from Table 4 that almost half of the NAL unit type values in the table, 14 out of 32 values, are either reserved for future use or the NAL unit type value is allocated for unspecified usage. In the current version of VVC, almost half of the NAL unit type values are thus never utilized, or seldom utilized, and it seems like the bits to signal this could be utilized better.

As a result of recognizing that almost half of the NAL unit type values in the current version of VVC are never used (or seldom used), this disclosure proposes one particular embodiment in which, in the most common cases, less than two bytes (e.g., just one byte) is used for the NAL unit header, instead of using two bytes as in the current VVC design. In one embodiment, the value of the NAL unit type is signaled with one or two codewords—one codeword in the first byte of the NAL unit header and the other codeword, if needed, in a NAL unit header extension. By arranging the NAL unit header values in a certain order it can be made such that a NAL unit header extension is only needed if a rarely used NAL unit type is signaled, or if another value in the NAL unit header extension, e.g. nu_layer_id or nuh_reserved_zero_bit from the current VVC draft specification, is different from their default values. In one embodiment, a flag is signaled in the NAL unit header that specifies if a NAL unit header extension is present or not. In one embodiment, if a NAL unit header extension is present, then the NAL unit type is derived using a codeword in the first part of the NAL unit header and a codeword from the NAL unit header extension; and, if the NAL unit header extension is not present, then the NAL unit type is derived using a codeword in the first part of the NAL unit header. For example, if the NAL unit header extension is not present, then the NAL unit type may be derived using one or more codewords in the first part of the NAL unit header and one or more predefined default values.

Accordingly, in one aspect there is a method performed by a video decoder. The method includes the video decoder obtaining a network abstraction layer (NAL) unit having a particular NAL unit type, the obtained NAL unit comprising a NAL unit header, the NAL unit header of the obtained NAL unit comprising at least a first part comprising N bits (N>0). The method also includes the video decoder obtaining NAL unit header (NUH) extension information that indicates whether or not the NAL unit header further comprises a second part that comprises M bits (M>0). The method further includes the video decoder determining, based on the NUH extension information, a NAL unit type value specifying the particular NAL unit type of the obtained NAL unit.

In another aspect there is a method performed by a video encoder. In one embodiment, the method includes the video encoder generating a network abstraction layer (NAL) unit having a particular NAL unit type, the generated NAL unit comprising a NAL unit header, wherein the NAL unit header comprises a first part and a second part. Generating the NAL unit includes setting a first codeword included in the first part of the NAL unit header to a first value based on a NAL unit type value that specifies the NAL unit type of the generated NAL unit and setting a second codeword included in the second part of the NAL unit header to a second value based on the NAL unit type value. The method also includes the video encoder providing NAL unit header (NUH) extension information specifying that the NAL unit header of the NAL unit comprises the second part.

One advantage of the above described embodiments is that it is possible to save bits in the NAL unit header by only using a NAL unit header extension for less frequently used NAL unit types. In the current VVC draft specification, there are 32 possible NAL unit type values, 18 allocated to specified NAL unit types, 10 are reserved for future use and 4 are allocated for unspecified usage. By arranging the bits and the NAL unit type values such that the codeword signaled in the NAL unit header extension is only needed for less frequently used NAL unit types, such as the reserved and unspecified values, it is possible to signal the NAL unit header without extension most of the time and only have an extension if a less frequent NAL unit type is used or when a layer ID larger than 0 is used.

Another advantage is that the number of NAL unit types could easily be extended in the NAL unit header extension without adding any extra cost to the NAL unit header for the more commonly used NAL unit types. In addition, one of the embodiments exploits an invalid combination to allow for additional NAL unit type values.

DETAILED DESCRIPTION

The embodiments described herein can be used in a video encoder or video decoder.

Figure 1:
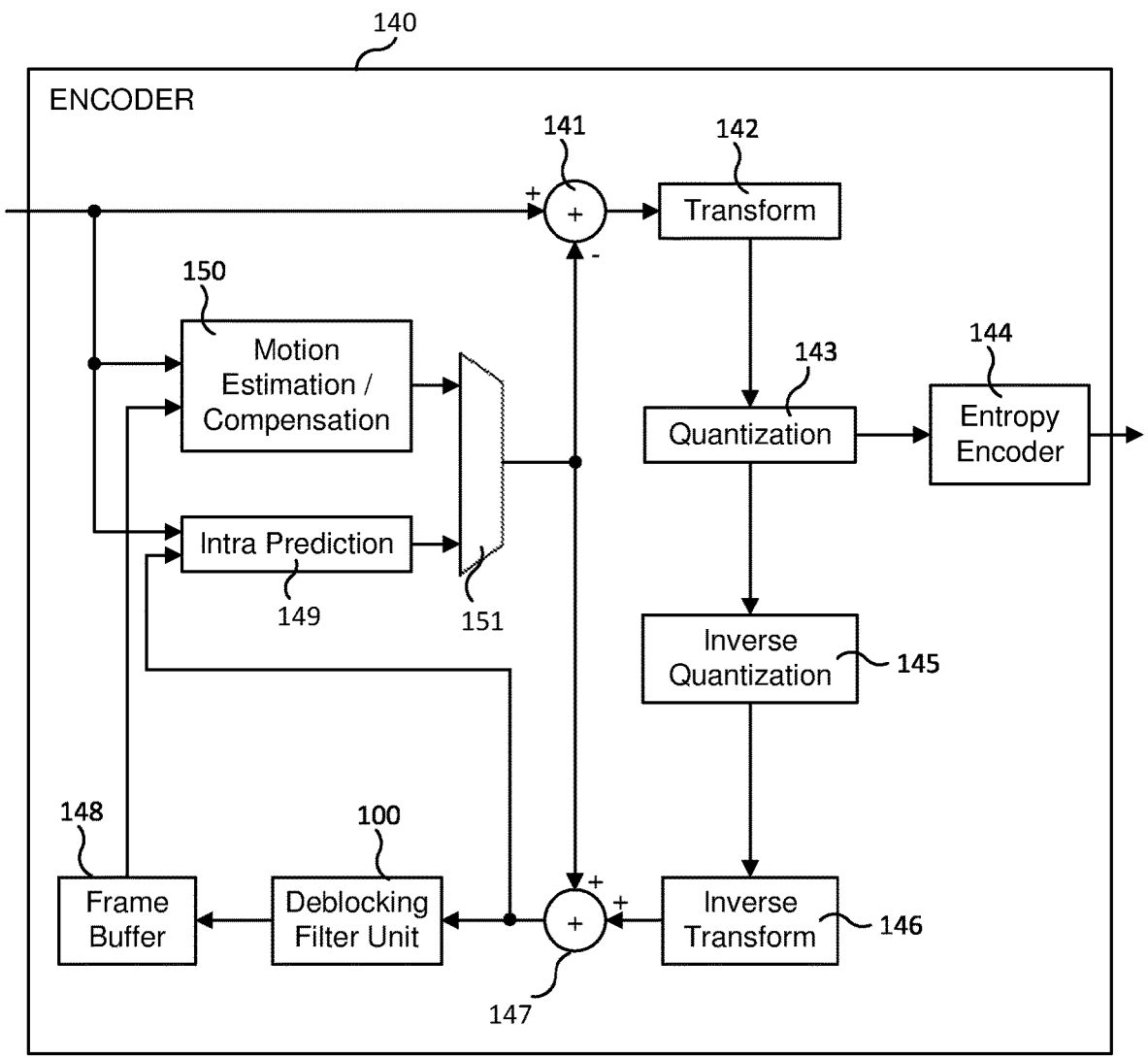
FIG. 1 is a schematic block diagram of a video encoder according to one embodiment.

FIG. 1 is a schematic block diagram of a video encoder 140 according to one embodiment. A current block of pixels is predicted by performing a motion estimation using motion estimator 150 from an already provided block of pixels in the same frame or in a previous frame. The result of the motion estimation is a motion or displacement vector associated with the reference block, in the case of inter prediction. The motion vector may be used by motion compensator 150 to output an inter prediction of the block of pixels. Intra predictor 149 computes an intra prediction of the current block of pixels. The outputs from the motion estimator/compensator 150 and the intra predictor 149 are input in selector 151 that either selects intra prediction or inter prediction for the current block of pixels. The output from the selector 151 is input to an error calculator in the form of adder 141 that also receives the pixel values of the current block of pixels. Adder 141 calculates and outputs a residual error as the difference in pixel values between the block of pixels and its prediction. The error is transformed in transformer 142, such as by a discrete cosine transform, and quantized by quantizer 143 followed by coding in encoder 144, such as by entropy encoder. In inter coding, also the estimated motion vector is brought to encoder 144 to generate the coded representation of the current block of pixels. The transformed and quantized residual error for the current block of pixels is also provided to an inverse quantizer 145 and inverse transformer 146 to retrieve the original residual error. This error is added by adder 147 to the block prediction output from the motion compensator 150 or intra predictor 149 to create a reference block of pixels that can be used in the prediction and coding of a next block of pixels. This new reference block is first processed by a deblocking filter 100. The processed new reference block is then temporarily stored in frame buffer 148, where it is available to intra predictor 149 and motion estimator/compensator 150.

Figure 2:
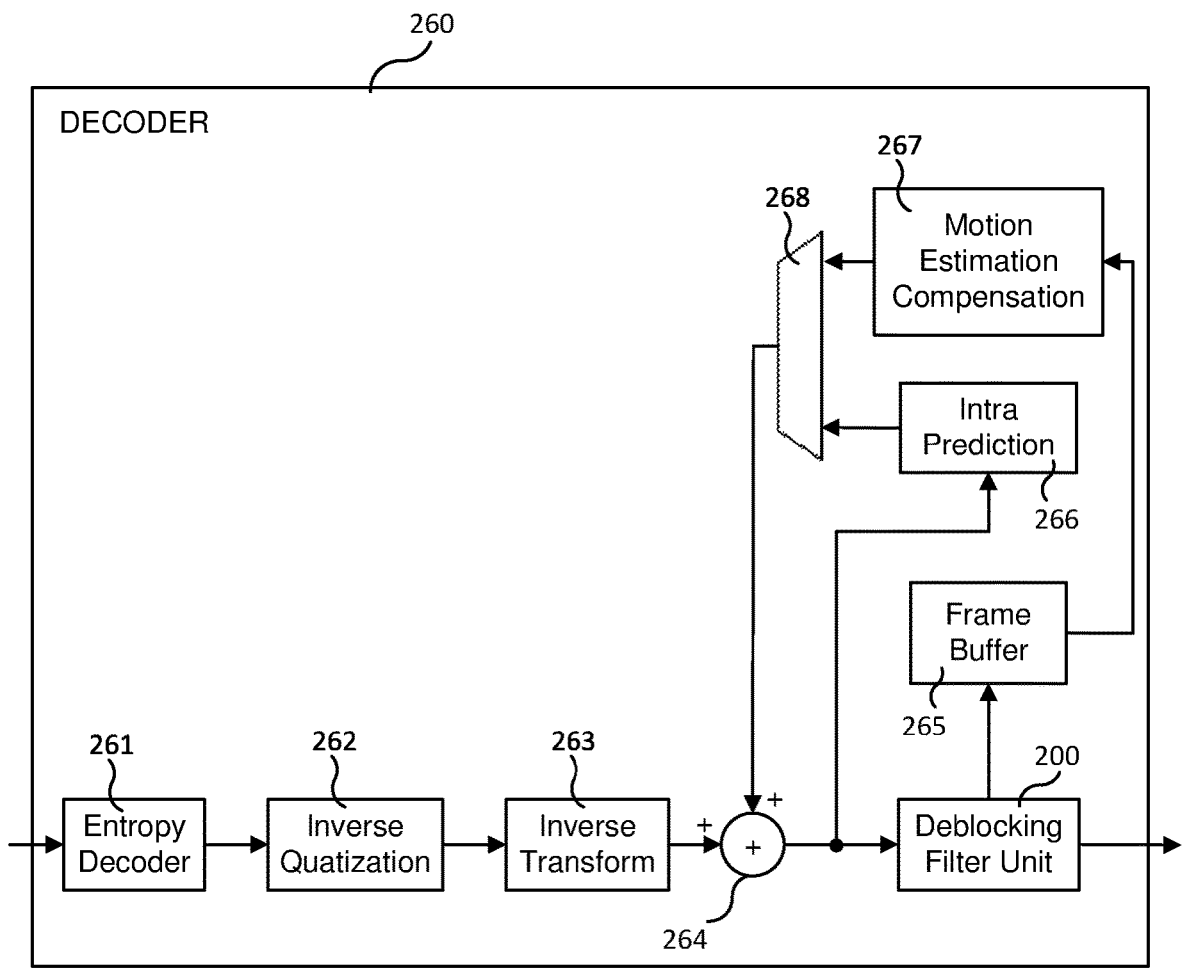
FIG. 2 is a schematic block diagram of a video decoder according to one embodiment.

FIG. 2 is a block diagram of a video decoder 260 according to some embodiments. Decoder 260 includes decoder 261, such as entropy decoder, to decode an encoded representation of a block of pixels to get a set of quantized and transformed residual errors. These residual errors are dequantized by inverse quantizer 262 and inverse transformed by inverse transformer 263 to provide a set of residual errors. These residual errors are added by adder 264 to the pixel values of a reference block of pixels. The reference block is determined by a motion estimator/compensator 267 or intra predictor 266, depending on whether inter or intra prediction is performed. Selector 268 is thereby interconnected to adder 264 and motion estimator/compensator 267 and intra predictor 266. The resulting decoded block of pixels output form adder 264 is input to deblocking filter 200. The filtered block of pixels is output from decoder 260 and may be furthermore temporarily provided to frame buffer 265 to be used as a reference block of pixels for a subsequent block of pixels to be decoded. Frame buffer 265 is thereby connected to motion estimator/compensator 267 to make the stored blocks of pixels available to motion estimator/compensator 267. The output from adder 264 may also be input to intra predictor 266 to be used as an unfiltered reference block of pixels.

This disclosure proposes a more compact representation of the NAL unit header for the most frequent NAL unit types and extends the NAL unit header for NAL unit types that are less frequently used.

Figure 3:
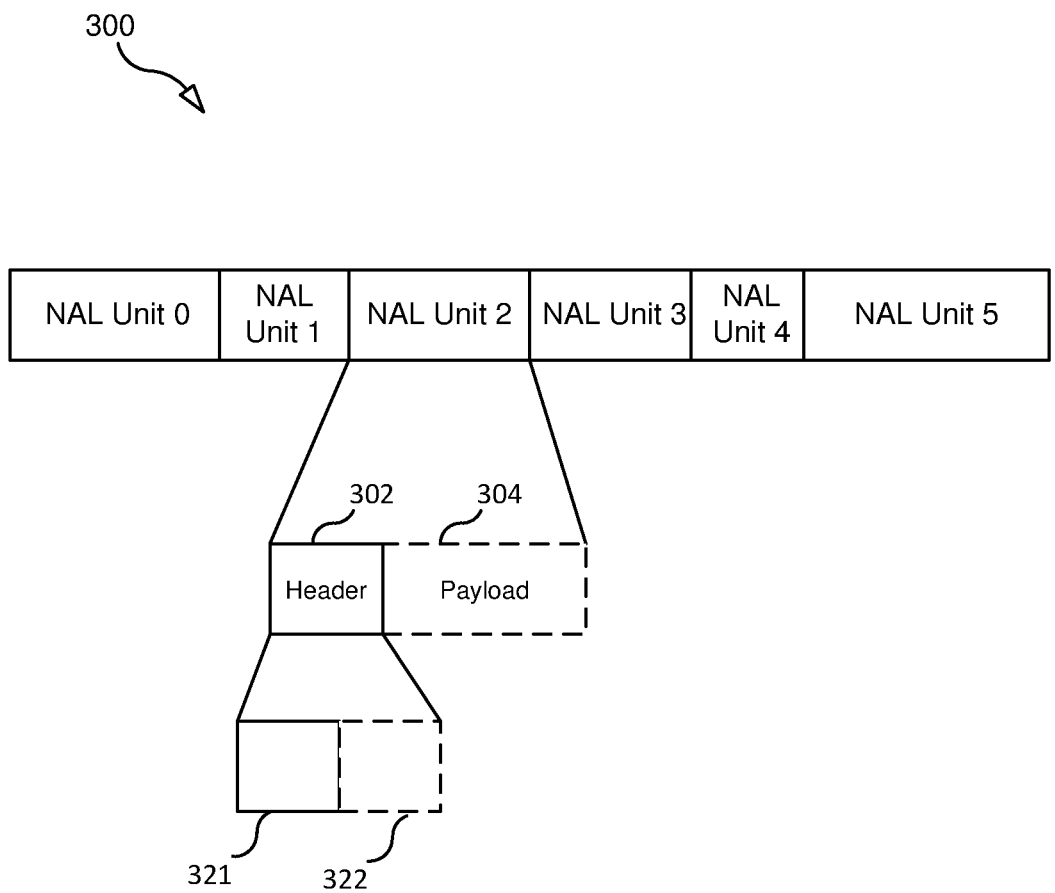
FIG. 3 illustrates a NAL unit header according to an embodiment.

Referring now to FIG. 3, FIG. 3 illustrates a bitstream 300, which comprises a number of NAL units (NAL units 0 to 5 are shown). Each NAL unit consists of a NAL unit header 302 and a NAL unit payload 304. A NAL unit may be either a VCL NAL unit where the payload comprises compressed video sample data (e.g., slice data) or a non-VCL NAL unit where the payload, if present, comprises non-VCL data that may be used in the decoding process (e.g., parameter set data), or be used to inform the decoder of things not related to the decoding process (e.g., SEI messages). In embodiments described herein, the NAL unit header 302 comprises a first part of the NAL unit header 321 that is always present and an optional second part 322 (a.k.a., "a NAL unit header extension" 322) that is not always present.

A NAL unit header includes a set of one or more codewords (i.e., a set of one or more bits), where each codeword is associated with a syntax element (see, e.g., the syntax elements identified in Tables 1 and 2, shown above). For example, as shown in Table 1, the syntax element "nal_unit_type" is associated with a particular set of six bits (i.e., the six bits that immediately precede the forbidden_zero_bit and that immediately follow the nu_layer_id bits).

First Version

In one embodiment a more compact representation of a NAL unit header is enabled by including extension information (e.g., a single bit) in the first part of the NAL unit header, where the extension information specifies whether or not the NAL unit header has a NAL unit header extension (or "extension" for short). In this embodiment, in order to be able to signal the desired number of NAL unit types, the NAL unit type value is derived from at least two values: a first value and a second value. The first value is decoded from one or more codewords in the first part of the NAL unit header. The second value is set to a predefined value (e.g., 0) if the extension information specifies that the NAL unit header does not have a NAL unit header extension, otherwise the second value is decoded from one or more codewords in the NAL unit header extension.

In one embodiment, the first part of the NAL unit header is coded with one byte (i.e., consists of one byte) and the NAL unit header extension is coded with one additional byte. Thus, in this embodiment, the NAL unit header will have a maximum of two bytes. In another embodiment, the first part of the NAL unit header and/or the NAL unit header extension may be coded with any number of bytes or bits.

In this version, the extension information that specifies whether or not the NAL unit header includes an extension is decoded from a codeword in the first part of the NAL unit header. The codeword may for instance represent a flag (e.g., a single bit flag). It could also represent a value that, in addition to indicating the presence of the NAL unit header extension, also provides more information, such as fully or partially defining the layer ID or the type of the NAL unit.

The NAL unit type value (NalUnitType) may be derived from a first value, val1, and a second value, val2, according to a function f(val1, val2) where the function may be: NalUnitType=f(val1, val2)=val1+val2, where val1 is a value derived from information included in the first part of the NAL unit header and val2 is a value derived from information included in the NAL unit header extension (assuming it exists) or is set to a default value when the NAL unit header does not include the NAL unit header extension.

The values could also be bit shifted such as: NalUnitType=f(val1, val2)=(val1<<X)+(val2<<Y), which is equivalent to f(val1, val2)=val1*$2^X$+val2*$2^Y$, where X and Y are non-negative integers.

The values val1 and val2 may also be combined with one or more values by a function f(val1, val2, valN), where f(val1, val2, valN) may for instance be:

NalUnitType=$f$(val1,val2, . . . ,val$N$)=val1+val2+ . . . +val$N$ or

NalUnitType=$f$(val$_1$,val$_2$, . . . ,val$_N$)=$\Sigma_{i=1}^{N}$(val$_i$<<$X_i$), where N is the number of values and each $X_i$ is a non-negative integer value.

In some versions of this embodiment the values are derived from separate codewords. In other versions of this embodiment one or more values may be derived from the same codeword, for instance, val2 may be derived from one codeword and val1 and val3 may be derived from another codeword, where all of val1, val2 and val3 are used for deriving the NAL unit type.

In one version of the embodiment the NAL unit type vale is derived as: NalUnitType=f(val1, val2, val3)=(val1<<X)+(val2<<Y)+val3, where val1, val2 and val3 are non-negative integer values of the codewords and X, Y are non-negative integers.

In the examples in this embodiment, some values may be derived from codewords corresponding to syntax elements in a first part of a NAL unit header and some values may be derived from codewords corresponding to syntax elements in a NAL unit header extension.

In a more specific version of this embodiment the NAL unit type is derived according to:

NalUnitType=$f$(val1,val2,val3,val4)=(val4<<$X_4$)+ (val1<<$X_1$)+(val2<<$X_2$)+(val3<<$X_3$), where val1 and val3 are the first bit and the two last bits, respectively, of the codeword corresponding to the nal_unit_type_lsb syntax element, which is located in the first part of a NAL unit header, val2 is the value of the codeword corresponding to the nal_unit_type_ext_bit syntax element which is a bit in the NAL unit header extension, val4 is the value of the codeword corresponding to the zero_tid_required_flag syntax element which is one bit in the first part of a NAL unit header, $X_4$=4, $X_1$=3, $X_2$=2 and $X_3$=0. val2 may be set equal to 0 if the NAL unit header extension is not present.

Figure 4:
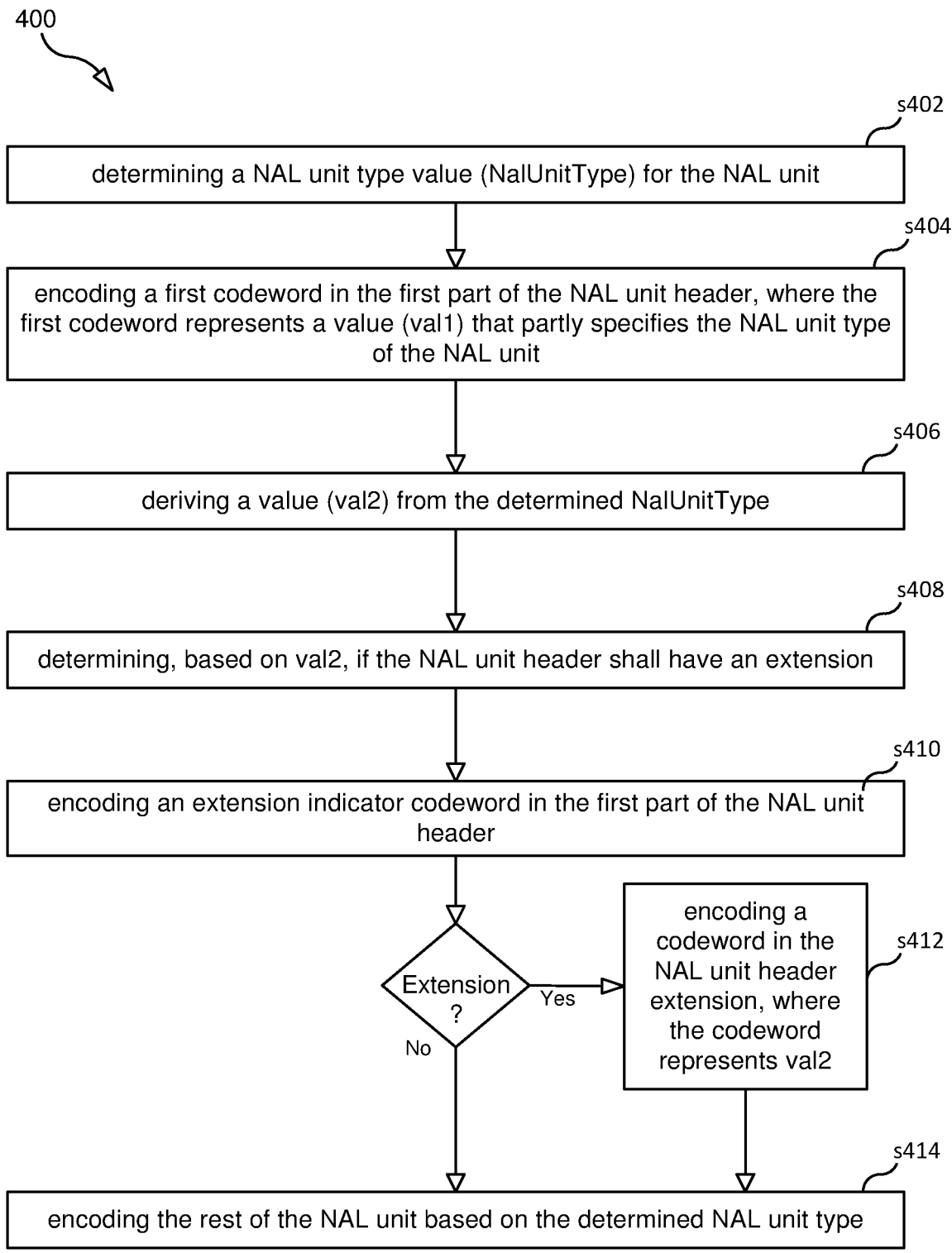
FIG. 4 is a flowchart illustrating an encoding process according to an embodiment.

FIG. 4 is a flowchart illustrating a process 400 that an encoder according to one embodiment may perform to generate a NAL unit. Process 400 may begin with step s402.

Step s402 comprises the encoder determining a NAL unit type value (NalUnitType) for the NAL unit.

Step s404 comprises the encoder encoding a first codeword in the first part of the NAL unit header, where the first codeword represents a value (val1) that partly specifies the NAL unit type of the NAL unit. In one embodiment, val1 is equal to (NalUnitType AND ($2^X$−1)), where X is an integer greater than 0. That is, in one embodiment, val1 is equal to the value of the X least significant bits of NalUnitType.

Step s406 comprises the encoder deriving a value (val2) from the determined NalUnitType. For instance, val2 may be derived as ((NAL unit type)>>X), where X is a non-negative integer and >> is a bitwise right shift operator.

Step s408 comprises the encoder determining, based on val2, if the NAL unit header shall have an extension. For instance, if val2 is equal to or greater than 1, then the encoder determines that the NAL unit header should have an extension. If val2 is equal to 0, then the encoder may determine whether the NAL unit header should have an extension based on additional information. For instance, if val2 is equal to 0 and the codeword corresponding to the nuh_layer_id syntax element is greater than 0, then the encoder determines that the NAL unit header should have an extension. Likewise, if val2 is equal to 0 and the codeword corresponding to the nuh_reserved_zero_bit syntax element is greater than 0, then the encoder determines that the NAL unit header should have an extension. But, if val2 is equal to 0 and nuh_reserved_zero_bit and nuh_layer_id are both 0, then the encoder determines that the NAL unit header should not have an extension.

Step s410 comprises the encoder encoding an extension indicator codeword in the first part of the NAL unit header, where the extension indicator codeword represents an extension indicator value that indicates whether a NAL unit header extension is present in the NAL unit header or not, based on the determining if the NAL unit header shall have an extension. The extension indicator could be a single bit.

Step s412 is performed if it is determined that the NAL unit header shall have an extension. Step s412 comprises the encoder encoding a codeword in the NAL unit header extension, where the codeword represents val2, where val2 partly specifies the NAL unit type of the NAL unit.

Step s414 comprises the encoder encoding the rest of the NAL unit based on the determined NAL unit type.

Figure 5:
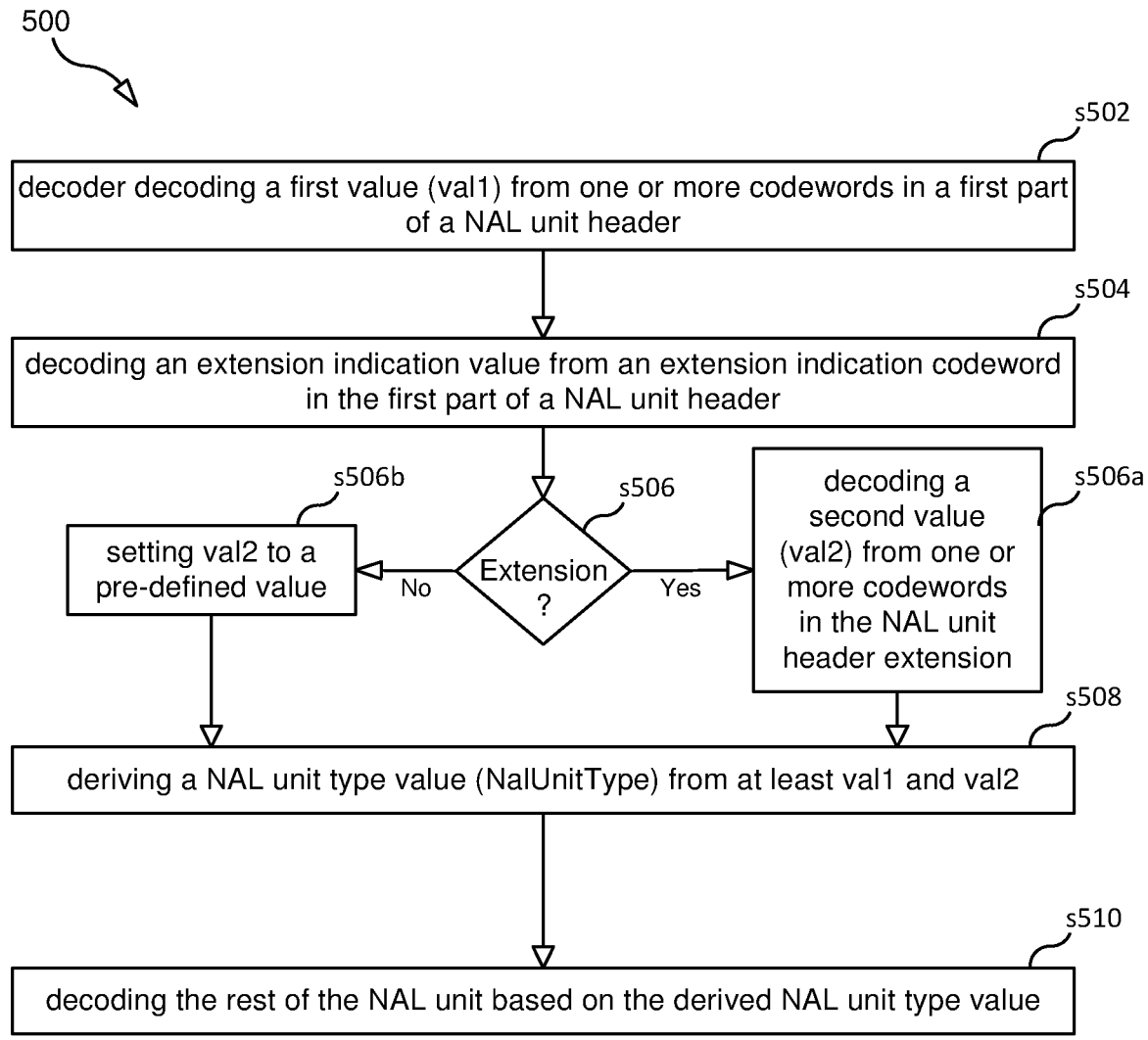
FIG. 5 is a flowchart illustrating a decoding process according to an embodiment.

FIG. 5 is a flowchart illustrating a process 500 that the decoder according to one embodiment may perform to decode a NAL unit. Process 500 may begin with step s502.

Step s502 comprises the decoder decoding a first value (val1) from one or more codewords (a single codeword is preferred) in a first part of a NAL unit header, where val1 partly specifies the NAL unit type of the NAL unit.

Step s504 comprises the decoder decoding an extension indication value from an extension indication codeword in the first part of a NAL unit header, where the extension indication value specifies whether or not a NAL unit header extension is present in the NAL unit. The extension indication codeword may be a single bit.

Step s506 comprises the decoder determining whether the extension indication value indicates that a NAL unit header extension is included in the NAL unit. If a NAL unit header extension is included in the NAL unit, then step s506a is performed otherwise step s506b is performed.

Step s506a comprises the decoder decoding a second value (val2) from one or more codewords (a single codeword is preferred) in the NAL unit header extension, where val2 also partly specifies the NAL unit type.

Step s506b comprises the decoder setting val2 (i.e., nut_ext_bit) to a pre-defined value (e.g., 0).

Step s508 comprises the decoder deriving a NAL unit type value (NalUnitType) from at least val1 and val2. The NAL unit type is derived according to any of the versions of the function f(val1, val2 . . . ) described in this embodiment or any other function. The NAL unit type may in one embodiment be derived according to: NalUnitType=(val2<<X)+val1, where X is a non-negative integer and << is a bitwise left shift operator, which is equivalent to: NalUnitType=val2*$2^{X+val}$1.

Step s510 comprises the decoder decoding the rest of the NAL unit based on the derived NAL unit type value.

Below are example syntax and semantics for a NAL unit header according to this embodiment. In the example shown below the first part of the NAL unit header includes a nuh_extension_flag that specifies whether the NAL unit header has an extension or not. One extra bit, nal_unit_type_ext_bit is signaled in the NAL unit header extension that is used together with the nal_unit_type_lsb to derive the NAL unit type of the NAL unit. In this example, the NAL unit header is first signaled with one byte and if the extension flag is set the extension is signaled with one additional byte. In the example, to fit the values in the extension byte, nuh_layer_id has been reduced to 6 bits. In another version of this embodiment nuh_layer_id could be signaled with 7 bits or another number of bits, by for instance extending the number of bits in the NAL unit header extension.

TABLE 5

NAL unit header syntax

|  | Descriptor |
|---|---|
| nal_unit_header() { |  |
|   zero_tid_required_flag | u(1) |
|   nuh_temporal_id_plus1 | u(3) |
|   nal_unit_type_lsb | u(3) |
|   nuh_extension_flag | u(1) |
|   if nuh_extension_flag { |  |
|     nuh_layer_id | u(6) |
|     nal_unit_type_ext_bit | u(1) |
|     nuh_reserved_zero_bit | u(1) |
|   } |  |
| } |  |

NAL Unit Header Semantics zero_tid_required_flag equal to 0 specifies that zero_tid_required_flag does not impose any additional constraints on the value of nuh_temporal_id1_plus1.

nuh_temporal_id_plus1 minus 1 specifies a temporal identifier for the NAL unit.

nal_unit_type_lsb specifies the three (3) least significant bits for the NAL unit type.

nuh_extension_flag equal to 1 specifies that the NAL unit header has an extension. nuh_extension_flag equal to 0 specifies that there is no NAL unit header extension.

nal_unit_type_ext_bit specifies the extension bit for the NAL unit type. If not present, nal_unit_type_ext_bit is inferred to be equal to 0.

The variable NalUnitType, which specifies the NAL unit type, i.e., the type of RBSP data structure contained in the NAL unit as specified in Table 4 above (which is taken from Table 7-1 of the VVC specification) is derived as follows:

NalUnitType=(zrtf<<4)+(msb-nut_lsb<<3)+ (nut_ext_bit<<2)+lsb-nut_lsb, where zrtf is the value of the codeword corresponding to the zero_tid_required_flag syntax element, msb-nut_lsb is the value of the most significant bit of the codeword corresponding to the nal_unit_type_lsb syntax element (i.e., msb-nut_lsb=nal_unit_type_lsb[2]), nut_ext_bit is the value of the codeword corresponding to the nat_unit_type_ext_bit syntax element, and lsb-nut_lsb is the value of the two most least significant bits of the codeword corresponding to the nal_unit_type_lsb syntax element (i.e., lsb-nut_lsb=nal_unit_type_lsb[0 . . . 1]).

NalUnitType may be equivalently expressed as:

NalUnitType=zrtf*$2^4$+msb-nut_lsb*$2^3$+ nut_ext_bit*$2^2$+lsb-nut_lsb.

NAL units that have NalUnitType in the range of UNSPEC28 . . . UNSPEC31, inclusive, for which semantics are not specified, shall not affect the decoding process.

nuh_layer_id specifies the identifier of the layer to which a VCL NAL unit belongs or the identifier of a layer to which a non-VCL NAL unit applies. If not present, the value of nuh_layer_id is inferred to be equal to 0.

nuh_reserved_zero_bit shall be equal to '0' when present. The value 1 of nuh_reserved_zero_bit may be specified in the future. Decoders may ignore (i.e. remove from the bitstream and discard) NAL units with nuh_reserved_zero_bit equal to '1'.

Second Version

This version is similar to the first with a difference that a VCL flag is included in the first part of the NAL unit header. This VCL flag specifies whether the NAL unit is a VCL or non-VCL NAL unit. The VCL flag may be used as an indicator to a bitstream parser to give early information whether a NAL unit is a VCL or a non-VCL NAL unit.

In a version of this embodiment, the VCL flag is used to derive the NAL unit type value together with syntax elements nal_unit_type_lsb, nuh_extension_flag and nul_unit_type_text_bit, which are described below.

In one version of the embodiment the NAL unit type value is derived as: NalUnitType=(VCL_flag<<Z)+(val1<<X)+ (val2<<Y)+val3, where VCL_flag is the value of the VCL flag value and X, Y and Z are non-negative integers.

In another version of this embodiment the NAL unit type value is derived according to: NalUnitType=(val4<<$X_4$)+ (val1<<$X_1$)+(val2<<$X_2$)+(val3<<$X_3$), where val1 is the value of the VCL flag, val3 is the value of nal_unit_type_lsb, val4 is zero_tid_required_flag, all located in the first part of the NAL unit header, val2 is the value of nal_unit_type_ext_bit which is a bit in the NAL unit header extension, $X_4$=4, $X_1$=3, $X_2$=2 and $X_3$=0.

Below are example syntax and semantics for this second version.

TABLE 6

NAL unit header syntax

|  | Descriptor |
|---|---|
| nal_unit_header() { |  |
|   zero_tid_required_flag | u(1) |
|   nuh_temporal_id_plus1 | u(3) |
|   vcl_flag | u(1) |
|   nal_unit_type_lsb | u(2) |
|   nuh_extension_flag | u(1) |
|   if nuh_extension_flag { |  |
|     nuh_layer_id | u(6) |
|     nal_unit_type_ext_bit | u(1) |
|     nuh_reserved_zero_bit | u(1) |
|   } |  |
| } |  |

NAL Unit Header Semantics zero_tid_required_flag equal to 0 specifies that zero_tid_required_flag does not impose any additional constraints on the value of nuh_temporal_id1_plus1.

nuh_temporal_id_plus1 minus 1 specifies a temporal identifier for the NAL unit.

vcl_flag equal to 1 indicates that the NAL unit is a VCL NAL unit or that the NAL unit type is unspecified. vcl_flag equal to 0 indicates that the NAL unit is a non-VCL NAL unit.

nal_unit_type_lsb specifies the two least significant bits for the NAL unit type value.

nuh_extension_flag equal to 1 specifies that the NAL unit header has an extension. nuh_extension_flag equal to 0 specifies that there is no NAL unit header extension.

nal_unit_type_ext_bit specifies the extension bit for the NAL unit type. If not present, nal_unit_type_ext_bit is inferred to be equal to 0.

The variable NalUnitType, which specifies the NAL unit type, i.e., the type of RBSP data structure contained in the NAL unit as specified in Table 4, is derived as follows:

NalUnitType=(zrtf<<4)+(vflag<<3)+(nut_ext_bit<<2)+nut_lsb, where zrtf is the value of the codeword corresponding to the zero_tid_required_flag syntax element, vflag is the value of the codeword corresponding to the vcl_flag syntax element, nut_ext_bit is the value of the codeword corresponding to the nal_unit_type_ext_bit syntax element, and nut_lsb is the value of the codeword corresponding to the nal_unit_type_lsb syntax element.

nuh_layer_id specifies the identifier of the layer to which a VCL NAL unit belongs or the identifier of a layer to which a non-VCL NAL unit applies. If not present, the value of nuh_layer_id is inferred to be equal to 0.

nuh_reserved_zero_bit shall be equal to '0' when present. The value 1 of nuh_reserved_zero_bit may be specified in the future. Decoders may ignore (i.e. remove from the bitstream and discard) NAL units with nuh_reserved_zero_bit equal to '1'.

Third Version

In this embodiment, the information specifying whether or not a NAL unit includes a NAL unit header extension is not included in the first part of the NAL unit header, but rather specified by other means, e.g. included in a parameter set (e.g., DPS, SPS, PPS or VPS), a header (e.g., picture header, slice header), or in another NAL unit (e.g., an access unit delimiter).

In one version of the embodiment the presence of a NAL unit header extension is signaled in SPS, e.g. by a flag. If the flag is set, all NAL units in the CVS have a NAL unit header extension, else all NAL units in the CVS do not have a NAL unit header extension. Since this flag is parsed after the NAL unit header for the SPS is parsed, the SPS NAL unit header will have a default behavior whether the NAL unit header extension is present or not. For instance, SPS NAL unit headers may always have a NAL unit header extension present at all times.

In one version of the embodiment, the presence of a NAL unit header extension is signaled in PPS, VPS, a picture header, or an access unit delimiter, e.g. by a flag. If the flag is set, all NAL units in the picture or access unit have a NAL unit header extension, else all NAL units in the picture or access unit do not have a NAL unit header extension. Like the case for SPS, since this flag is parsed after the NAL unit header where the flag is carried is parsed, this NAL unit header will have a default behavior whether the NAL unit header extension is present or not. For instance, the NAL unit wherein the extension flag is carried may always have a NAL unit header extension present at all times.

In another version of the embodiment the NAL unit header extension is present if layers are used. If layers are used or not may be specified by one or more codewords, e.g. a flag, in a parameter set such as DPS, SPS, PPS, VPS or in the first part of the NAL unit header. If the one or more codewords specify that layers are used, then the NAL unit header extension is present in the NAL unit header and contains the layer ID, nuh_layer_id, for the NAL unit. If the one or more codewords specify that layers are not used, then the NAL unit header extension is not present in the NAL unit and the layer ID, nuh_layer_id, is inferred to be 0.

Fourth Version

In this embodiment, it is specified whether a bitstream may include NAL unit header extensions or not. For example, in one specific aspect of this embodiment, information specifies whether or not the first part of each NAL unit header includes a NAL unit header extension codeword that specifies whether or not the NAL unit header includes a NAL unit header extension.

In one version of the embodiment, it is specified by a profile, tier or level if a NAL unit header extension may be present in the bitstream or not. That is, for a certain profile, tier or level, it is specified that a bitstream may comprise NAL unit header extensions whereas for another profile, tier or level NAL unit header extensions may not be present in the bitstream. For instance, a main profile may specify that NAL unit header extensions may be present in the bitstream whereas a restricted low-delay profile may specify that NAL unit header extensions may not be present in the bitstream, e.g. the NAL unit header is always signaled with one byte. In this case the bit that was used for the extension flag could instead be used for NAL unit types or be a reserved bit for future extensions.

A profile, tier or level could also define that a NAL unit header extension shall be present for all NAL unit headers in the bitstream. For instance, a scalable profile, that frequently uses nuh_layer_id may specify that a NAL unit header extension shall always be present in a NAL unit header in the bitstream. In this case the bit used for the extension flag could for instance be used for specifying more layer IDs.

In other versions of this embodiment, it is specified by other means whether a bitstream may include a NAL unit header extension indication, e.g. in the first part of the NAL unit header, or not. This may for instance be signaled in a DPS, VPS, or SPS.

Fifth Version (Use Escape Mechanism to Signal NAL Unit Type)

In another embodiment, the first part of the NAL unit header includes a codeword that specifies whether or not the NAL unit header includes a NAL unit header extension, wherein the codeword comprises multiple bits (e.g., at least four bits or at least six bits). In one embodiment, the codeword corresponds to a nal_unit_type_lsb syntax element, which, in one embodiment, consists of four (4) bits. In another embodiment, the codeword corresponds to a nal_unit_type syntax element, which, in one embodiment, consists of six (6) bits. In these embodiments, if the codeword is set to a specific value (e.g., TRIGGER_NAL_UNIT_HEADER_EXTENSION), then the codeword indicates that the NAL unit header includes the NAL unit header extension, otherwise the codeword indicates that the NAL unit header does not include any NAL unit header extension. Example syntax and semantics for this embodiment are shown below where the first part of the NAL unit header is signaled with one byte and the NAL unit header extension is signaled with two bytes.

TABLE 7

NAL unit header syntax

| | Descriptor |
|---|---|
| nal_unit_header() { | |
|   zero_tid_required_flag | u(1) |
|   nuh_temporal_id_plus1 | u(3) |
|   nal_unit_type_lsb | u(4) |
|   if (nal_unit_type == TRIGGER_NAL_UNIT_HEADER_EXTENSION) { | |
|     nuh_layer_id | u(7) |
|     nal_unit_type_extenstion | u(5) |
|     nuh_reserved_zero_bit | u(4) |
|   } | |
| } | |

Semantics zero_tid_required_flag equal to 0 specifies that zero_tid_required_flag does not impose any additional constraints on the value of nuh_temporal_id1_plus1.

nuh_temporal_id_plus1 minus 1 specifies a temporal identifier for the NAL unit.

nal_unit_type_lsb specifies the two least significant bits for the NAL unit type value.

nal_unit_type_extension specifies the NAL unit type for the NAL unit when the NAL unit header extension is present.

nuh_layer_id specifies the identifier of the layer to which a VCL NAL unit belongs or the identifier of a layer to which a non-VCL NAL unit applies. If not present, the value of nuh_layer_id is inferred to be equal to 0.

nuh_reserved_zero_bit shall be equal to '0' when present. The value 1 of nuh_reserved_zero_bit may be specified in the future. Decoders may ignore (i.e. remove from the bitstream and discard) NAL units with nuh_reserved_zero_bit equal to '1'.

The variable NalUnitType, which specifies the NAL unit type, i.e., the type of RBSP data structure contained in the NAL unit, is derived as follows:

TABLE 8

If nal_unit_type = = TRIGGER_NAL_UNIT_HEADER_EXTENSION, then
  NalUnitType = nal_unit_type_extension
Otherwise
  NalUnitType = zrtf*$2^4$ + nal_unit_type_lsb In one embodiment, the value TRIGGER_NAL_UNIT_READER_EXTENSION is set equal to 15.

Sixth Version

In this version an invalid combination of zero_tid_required_flag and nuh_temporal_id_plus1 is exploited to gain extra NAL unit type positions. That is, the fact that NAL unit types starting with 1000b do not emulate any MPEG-2 start codes is exploited. In the current version of VVC, if the zero_tid_required_flag is 1, then nuh_temporal_id_plus1 must be 1, meaning that the first bits becomes 1001b. However, looking at Table 3 we see that also 1000b is a valid combination, i.e. when zero_tid_required_flag is 1 and nuh_temporal_id_plus1 is equal to 0.

One way to exploit this is to let the temporal ID be either 0 or 1 when zero_tid_required_flag is 1. However, this is not very useful in the current version of VVC, since the NAL unit types assigned to the NAL unit type values where zero_tid_required_flag is 1 may anyway not use any temporal ID other than 0.

Another way to exploit this is to allow for extra NAL unit type values for the combinations where the NAL unit header starts with 1000b. In the example below, 16 additional NAL unit type values are acquired by exploiting the combinations where the NAL unit header starts with 1000b. A total of 48 unique NAL unit types may thus be used as shown in TABLE 10. The values of nal_unit_type_ext_bit, vcl_flag, zero_tid_required_flag and 1-tId_lsb in TABLE 10 are for information.

In the example, the syntax table is the same as in the second version described above and reproduced below.

TABLE 9

NAL unit header syntax

| | Descriptor |
|---|---|
| nal_unit_header() { | |
|   zero_tid_required_flag | u(1) |
|   nuh_temporal_id_plus1 | u(3) |
|   vcl_flag | u(1) |
|   nal_unit_type_lsb | u(2) |
|   nuh_extension_flag | u(1) |
|   if nuh_extension_flag { | |
|     nuh_layer_id | u(6) |
|     nal_unit_type_ext_bit | u(1) |
|     nuh_reserved_zero_bit | u(1) |
|   } | |
| } | |

NAL Unit Header Semantics nuh_temporal_id_plus1 minus 1 specifies a temporal identifier for the NAL unit. The value of nuh_temporal_id_plus1 shall not be equal to 0 when zero_tid_required_flag is equal to 0. When zero_tid_required_flag is equal to 1, the value of nuh_temporal_id_plus1 shall be equal to 0 or 1. The variable TemporalId is derived as follows: if zero_tid_required_flag is equal to 1, then TemporalId=0, otherwise, TemporalId=nuh_temporal_id_plus1−1. The value of TemporalId shall be the same for all VCL NAL units of an access unit. The value of TemporalId of a coded picture or an access unit is the value of the TemporalId of the VCL NAL units of the coded picture or the access unit. The value of TemporalId for non-VCL NAL units is constrained as follows: If NalUnitType is equal to SPS_NUT, TemporalId is equal to 0 and the TemporalId of the access unit containing the NAL unit shall be equal to 0. Otherwise, if NalUnitType is equal to APS_NUT, TemporalId shall be equal to that of the access unit containing the NAL unit. Otherwise, when NalUnitType is not equal to EOS_NUT and not equal to EOB_NUT, TemporalId shall be greater than or equal to the TemporalId of the access unit containing the NAL unit. When the NAL unit is a non-VCL NAL unit, the value of TemporalId is equal to the minimum value of the TemporalId values of all access units to which the non-VCL NAL unit applies. When NalUnitType is equal to PPS_NUT, TemporalId may be greater than or equal to the TemporalId of the containing access unit, as all picture parameter sets (PPSs) may be included in the beginning of a bitstream, wherein the first coded picture has TemporalId equal to 0. When NalUnitType is equal to PREFIX_SEI_NUT or SUFFIX_SEI_NUT, TemporalId may be greater than or equal to the TemporalId of the containing access unit, as an SEI NAL unit may contain information that applies to a bitstream subset that includes access units for which the TemporalId values are greater than the TemporalId of the access unit containing the SEI NAL unit.

vcl_flag equal to 1 indicates that the NAL unit is a VCL NAL unit or that the NAL unit type is unspecified. vcl_flag equal to 0 indicates that the NAL unit is a non-VCL NAL unit.

nal_unit_type_lsb specifies the least significant bits for the NAL unit type.

nuh_extension_flag equal to 1 specifies that the NAL unit header has an extension. nuh_extension_flag equal to 0 specifies that there is no NAL unit header extension.

nal_unit_type_ext_bit specifies the extension bit for the NAL unit type. If not present, nal_unit_type_ext_bit is inferred to be equal to 0.

The variable NalUnitType, which specifies the NAL unit type, i.e., the type of RBSP data structure contained in the NAL unit as specified in TABLE 10, is derived as follows:

$A = (\text{nal\_unit\_type\_ext\_bit} << 3) + ((1-\text{vcl\_flag}) << 2) + (\text{zero\_tid\_required\_flag} << 1) + \text{AND}(\text{zero\_tid\_required\_flag}, \text{tId\_lsb})$ $B = (\text{nal\_unit\_type\_ext\_bit} << 1) + (1-\text{vcl\_flag}) + \text{zero\_tid\_required\_flag}$ $\text{NalUnitType} = (A-B) << 2 + \text{nal\_unit\_type\_lsb}$ where AND is a bitwise AND operator and tId_lsb is the least significant bit of nuh_temporal_id_plus1.

TABLE 10

NAL unit type values and NAL unit type calasses

| NalUnit Type | Name of NalUnitType | NAL unit type class | nal_unit_ type_ext_ bit | vcl_ flag | zero_tid_ required_ flag | 1_ tId_ lsb |
|---|---|---|---|---|---|---|
| 0 | TRAIL_NUT | VCL | 0 | 1 | 0 | 0 |
| 1 | STSA_NUT | VCL | 0 | 1 | 0 | 0 |
| 2 | RADL_NUT | VCL | 0 | 1 | 0 | 0 |
| 3 | RASL_NUT | VCL | 0 | 1 | 0 | 0 |
| 4 | IDR_W_RADL | VCL | 0 | 1 | 1 | 0 |
| 5 | IDR_N_LP | VCL | 0 | 1 | 1 | 0 |
| 6 | CRA_NUT | VCL | 0 | 1 | 1 | 0 |
| 7 | GRA_NUT | VCL | 0 | 1 | 1 | 0 |
| 8 ... 11 | RSV_VCL_tID0_8 ... RSV_VCL_tID0_11 | VCL | 0 | 1 | 1 | 1 |
| 12 | PPS_NUT | non-VCL | 0 | 0 | 0 | 0 |
| 13 | AUD_NUT | non-VCL | 0 | 0 | 0 | 0 |
| 14 | PREFIX_SEI_NUT | non-VCL | 0 | 0 | 0 | 0 |
| 15 | SUFFIX_SEI_NUT | non-VCL | 0 | 0 | 0 | 0 |
| 16 | DPS_NUT | non-VCL | 0 | 0 | 1 | 0 |
| 17 | SPS_NUT | non-VCL | 0 | 0 | 1 | 0 |
| 18 | EOS_NUT | non-VCL | 0 | 0 | 1 | 0 |
| 19 | EOB_NUT | non-VCL | 0 | 0 | 1 | 0 |
| 20 | VPS_NUT | non-VCL | 0 | 0 | 1 | 1 |
| 21 ... 23 | RSV_NVCL_tID0_21 ... RSV_NVCL_tID0_23 | non-VCL | 0 | 0 | 1 | 1 |
| 24 ... 27 | RSV_VCL_24 ... RSV_VCL_27 | VCL | 1 | 1 | 0 | 0 |
| 28 ... 31 | RSV_VCL_tID0_28 ... RSV_VCL_tID0_31 | VCL | 1 | 1 | 1 | 0 |
| 32 ... 35 | RSV_VCL_tID0_32 ... RSV_VCL_tID0_35 | VCL | 1 | 1 | 1 | 1 |
| 36 | APS_NUT | non-VCL | 1 | 0 | 0 | 0 |
| 37 ... 39 | RSV_NVCL_37 ... RSV_NVCL_39 | non-VCL | 1 | 0 | 0 | 0 |
| 40 ... 43 | RSV_NVCL_tID0_40 ... RSV_NVCL_tID0_43 | non-VCL | 1 | 0 | 1 | 0 |
| 44 ... 47 | UNSPEC_44 ... UNSPEC_47 | non-VCL | 1 | 0 | 1 | 1 |

Figure 6:
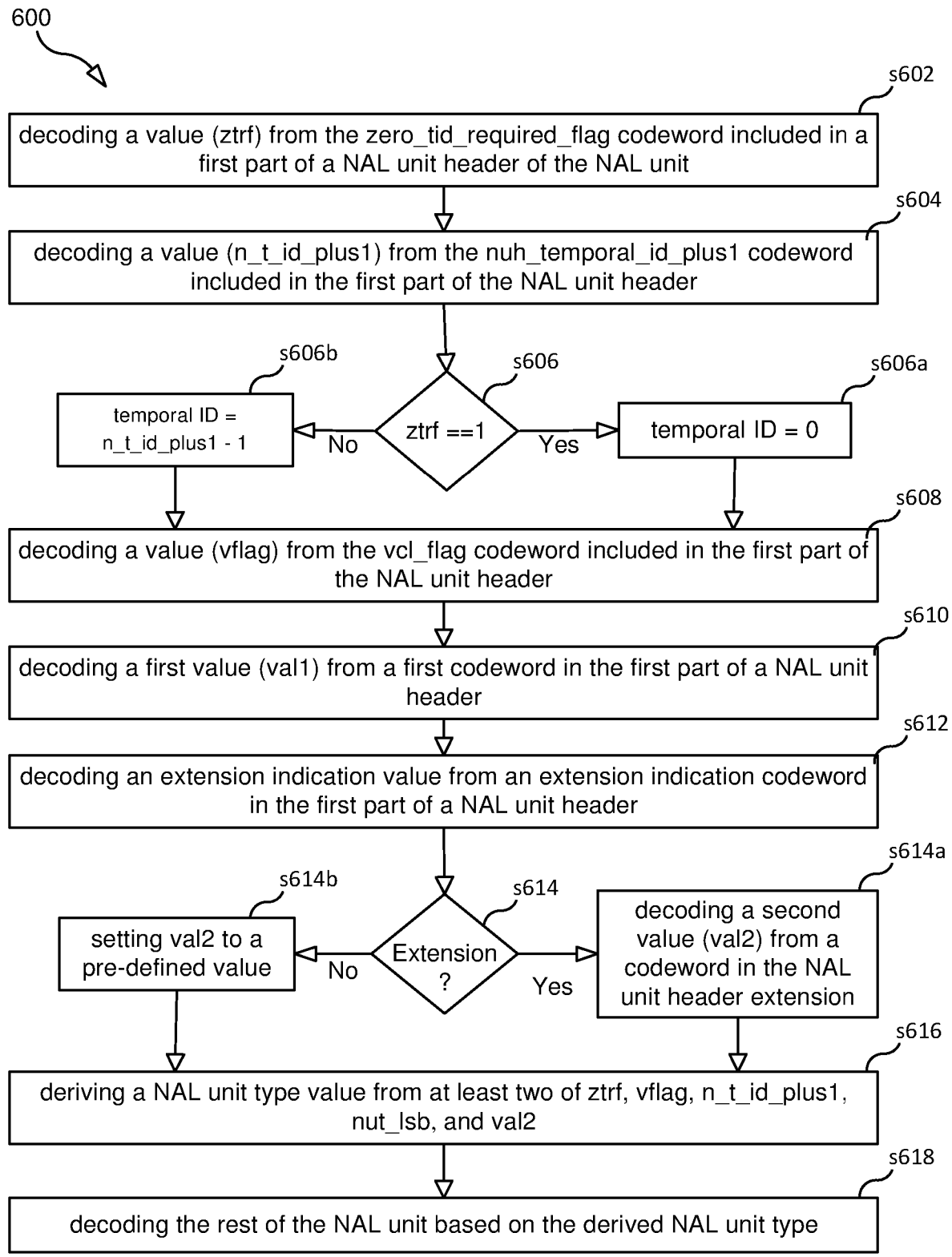
FIG. 6 is a flowchart illustrating a decoding process according to an embodiment.

FIG. 6 is a flowchart illustrating a process 600 that the decoder according to one embodiment may perform to decode a NAL unit. Process 600 may begin with step s602.

Step s602 comprises the decoder decoding a value (ztrf) from the zero_tid_required_flag codeword included in a first part of a NAL unit header of the NAL unit.

Step s604 comprises the decoder decoding a value (n_t_id_plus1) from the nuh_temporal_id_plus1 codeword included in the first part of the NAL unit header.

Step s606 comprises the decoder determining whether ztrf is equal to 1. If it is, then step s606a is performed otherwise step s606b is performed.

Step s606a comprises the decoder setting temporal ID to 0.

Step s606b comprises the decoder setting temporal ID equal to n_t_id_plus1−1.

Step s608 comprises the decoder decoding a value (vflag) from the vcl_flag codeword included in the first part of the NAL unit header.

Step s610 comprises the decoder decoding a first value (val1) from a first codeword in the first part of a NAL unit header, where val1 partly specifies the NAL unit type of the NAL unit. The first value val1 may be called nal_unit_type_lsb (or "nut_lsb" for short).

Step s612 comprises the decoder decoding an extension indication value from an extension indication codeword in the first part of a NAL unit header, where the extension indication value indicates whether or not a NAL unit header extension is included in the NAL unit. The extension indication value may be called nuh_extension_flag (or "nuh_ext_flag" for short).

Step s614 comprises the decoder determining whether the extension indication value indicates that a NAL unit header extension is included in the NAL unit. If a NAL unit header extension is included in the NAL unit, then step s614a is performed otherwise step s614b is performed.

Step s614a comprises the decoder decoding a second value (val2) from a codeword in the NAL unit header extension, where val2 also partly specifies the NAL unit type. The second value val2 may be called nal_unit_type_ext_bit (or "nut_ext_bit" for short).

Step s614b comprises the decoder setting val2 (i.e., nut_ext_bit) to a pre-defined value (e.g., 0).

Step s616 comprises the decoder deriving a NAL unit type value from at least two of ztrf, vflag, n_t_id_plus1, nut_lsb, and nut_ext_bit. For instance, the NAL unit type may be derived as:

$A=(\text{nut\_ext\_bit}<<3)+((1-\text{vflag})<<2)+(\text{ztrf}<<1)+\text{AND}(\text{ztrf},\text{tId\_lsb})$ $B=(\text{nut\_ext\_bit}<<1)+(1-\text{vflag})+\text{ztrf}$ $\text{NalUnitType}=(A-B)<<2+\text{nut\_lsb},$ where AND is a bitwise AND operator and tId_lsb is the least significant bit of nuh_temporal_id_plus1.

Step s618 comprises the decoder decoding the rest of the NAL unit based on the derived NAL unit type.

Figure 7:
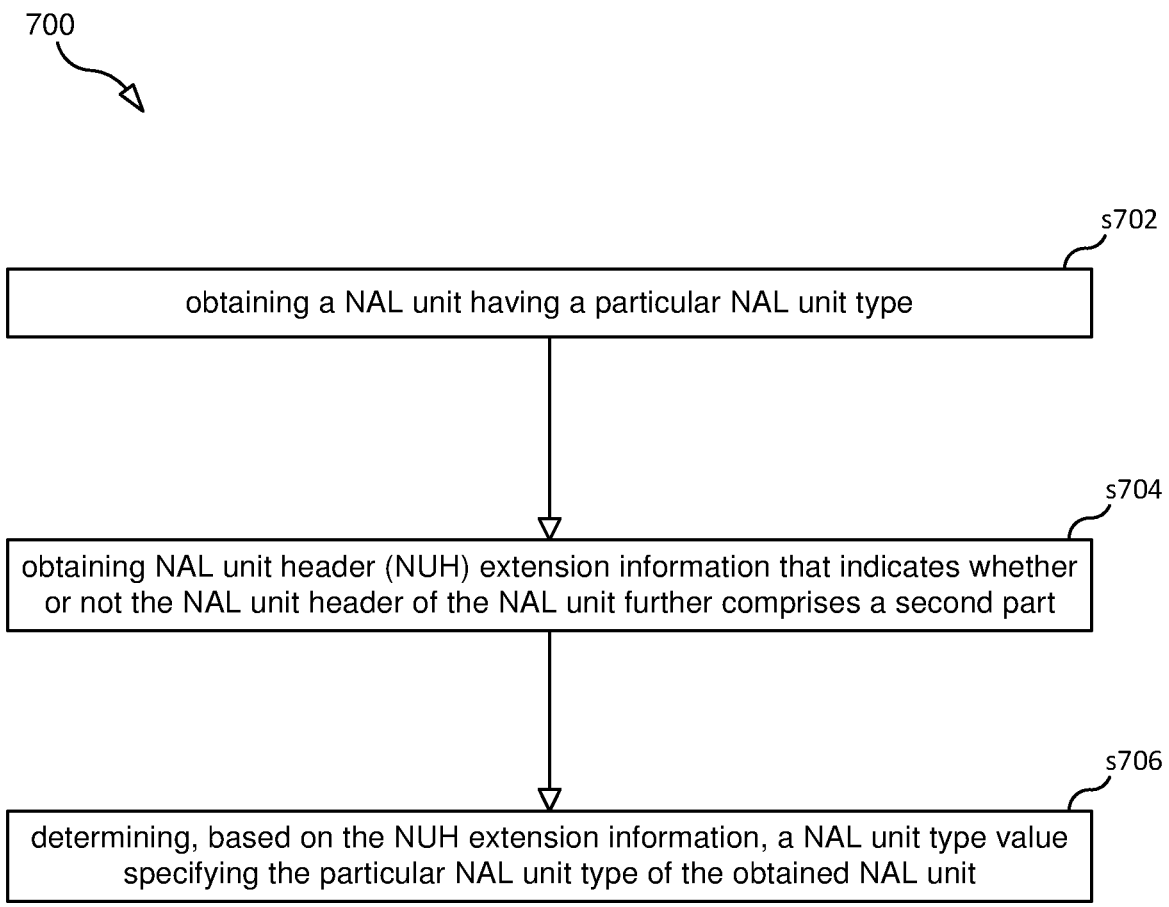
FIG. 7 is a flowchart illustrating a decoding process according to an embodiment.

FIG. 7 is a flowchart illustrating a process 700 that the decoder according to one embodiment may perform to decode a NAL unit. Process 700 may begin with step s702.

Step s702 comprises the decoder obtaining a NAL unit having a particular NAL unit type, the obtained NAL unit comprising a NAL unit header, the NAL unit header of the obtained NAL unit comprising at least a first part comprising N bits.

Step s704 comprises the decoder obtaining NAL unit header (NUH) extension information that indicates whether or not the NAL unit header further comprises a second part that comprises M bits.

Step s706 comprises the decoder determining, based on the NUH extension information, a NAL unit type value specifying the particular NAL unit type of the obtained NAL unit.

In one embodiment, determining the NAL unit type value based on the NUH extension information comprises: i) the decoder determining that the NUH extension information indicates that the obtained NAL unit header further comprises the second part; and ii) the decoder, as a result of determining that the NUH extension information indicates that the obtained NAL unit header further comprises the second part, determining the NAL unit type value based on a first codeword included in the first part of the NAL unit header and a second codeword included in the second part of the NAL unit header. In one embodiment, determining the NAL unit type value based on the first codeword included in the first part of the NAL unit header and the second codeword included in the second part of the NAL unit header comprises: i) the decoder calculating the NAL unit type value using the first codeword and the second codeword. In one embodiment, the NAL unit type value is calculated using not only the first and second codewords, but also a third codeword included in the first part of the NAL unit header. In one embodiment, calculating the NAL unit type value using the first codeword included in the first part of the NAL unit header, the second codeword included in the second part of the NAL unit header, and the third codeword included in the first part of the NAL unit header results in a NAL unit type value that is equal to: $cw1*2^A+cw2*2^B+cw3*2^C$, wherein cw1 is the value of the first codeword, cw2 is the value of the second codeword, cw3 is the value of the third codeword, and A, B and C are integer numbers equal to or larger than 0. It is noted that $cw1*2^A+cw2*2^B+cw3*2^C$ can be equivalently expressed as: $(cw1<<A)+(cw<<B)+(cw3<<C)$, were $<<$ is a bitwise left shift operator.

In one embodiment, calculating the NAL unit type value using the first codeword included in the first part of the NAL unit header, the second codeword included in the second part of the NAL unit header, and the third codeword included in the first part of the NAL unit header results in a NAL unit type value that is equal to: $ztrf*2^4+\text{msb-nut\_lsb}*2^3+\text{nut\_ext\_bit}*2^2+\text{lsb-nut\_lsb}$, where ztrf is the value of the third codeword and the third codeword consists of a single bit, msb-nut_lsb is the most significant bit of the first codeword and the first codeword consists of three bits, nut_ext_bit is the value of the second codeword and the second codeword consists of a single bit, and lsb-nut_lsb is the two least significant bits of the first codeword. In one embodiment, zrtf is the value of the codeword corresponding to the zero_tid_required_flag syntax element, msb-nut_lsb is the value of the most significant bit of the codeword corresponding to the nal_unit_type_lsb syntax element (i.e., msb-nut_lsb=nal_unit_type_lsb[2]), nut_ext_bit is the value of the codeword corresponding to the nat_unit_type_ext_bit syntax element, and lsb-nut_lsb is the value of the two most least significant bits of the codeword corresponding to the nal_unit_type_lsb syntax element (i.e., lsb-nut_lsb=nal_unit_type_lsb[0 . . . 1]).

In one embodiment, determining the NAL unit type value based on the first codeword included in the first part of the NAL unit header and the second codeword included in the second part of the NAL unit header comprises calculating the NAL unit type value using: i) the first codeword included in the first part of the NAL unit header, ii) the second codeword included in the second part of the NAL unit header, iii) a third codeword included in the first part of the NAL unit header, and iv) a fourth codeword included in the first part of the NAL unit header. In one embodiment, calculating the NAL unit type value using the first codeword, the second codeword, the third codeword, and the fourth codeword results in a NAL unit type value that is equal to: $cw1*2^A+cw2*2^B+cw3*2^C+cw4*2^D$, where cw1 is the value of the first codeword, cw2 is the value of the second codeword, cw3 is the value of the third codeword, cw4 is the value of the fourth codeword, and A, B, C and D are integer numbers equal to or larger than 0. In one embodiment, calculating the NAL unit type value using the first, second, third, and fourth codewords results in a NAL unit type value that is equal to: $ztrf*2^4+vflag*2^3+\text{nut\_ext\_bit}*2^2+\text{nut\_lsb}$, where ztrf is the value of the third codeword and the third codeword consists of a single bit, vflag is the value of the fourth codeword and the fourth codeword consists of a single bit, nut_ext_bit is the value of the second codeword and the second codeword consists of a single bit, and nut_lsb is the value of the first codeword and the first codeword consists of two bits.

In one embodiment, obtaining the NUH extension information comprises the decoder obtaining the NUH extension information from the first part of the NAL unit header. In one embodiment, the NUH extension information consists of the value of a single bit included in the first part of the NAL unit header. In another embodiment, obtaining the NUH extension information comprises obtaining the NUH extension information from a parameter set (e.g., DPS, SPS, PPS, VPS), from a picture header, from a slice header, or from an access unit delimiter. In another embodiment, obtaining the NUH extension information comprises obtaining the NUH extension information based on a specified profile, tier, or level.

In one embodiment, determining the NAL unit type value based on the first codeword included in the first part of the NAL unit header and the second codeword included in the second part of the NAL unit header comprises calculating the NAL unit type value using the first codeword included in the first part of the NAL unit header, the second codeword included in the second part of the NAL unit header, a third codeword included in the first part of the NAL unit header, a fourth codeword included in the first part of the NAL unit header, and the least significant bit of a fifth codeword included in the first part of the NAL unit header. In one embodiment, calculating the NAL unit type value results in NAL unit type value that is equal to:

$$(A-B)*2^2 + \text{nut\_lsb, where}$$

nut_lsb is the value of the first codeword and the first codeword consists of two bits, A is equal to: $\text{nut\_ext\_bit}*2^3 + (1-\text{vflag})*2^2 + \text{ztrf}*2^1 + \text{AND}(\text{ztrf}, \text{tId\_lsb})$, B is equal to $\text{nut\_ext\_bit}*2^1 + (1-\text{vflag}) + \text{ztrf}$, nut_ext_bit is the value of the second codeword and the second codeword consists of a single bit, ztrf is the value of the third codeword and the third codeword consists of a single bit, vflag is the value of the fourth codeword and the fourth codeword consists of a single bit, AND is a bitwise AND operation, and tId_lsb is the least significant bit of the fifth codeword.

In one embodiment, determining the NAL unit type value based on the NUH extension information comprises determining that the NUH extension information indicates that the obtained NAL unit further comprises the second part, and, as a result of determining that the NUH extension information indicates that the obtained NAL unit further comprises the second part, the decoder determining the NAL unit type value based solely on a codeword included in the second part of the NAL unit header, wherein the codeword is at least 5 bits in length.

Figure 8:
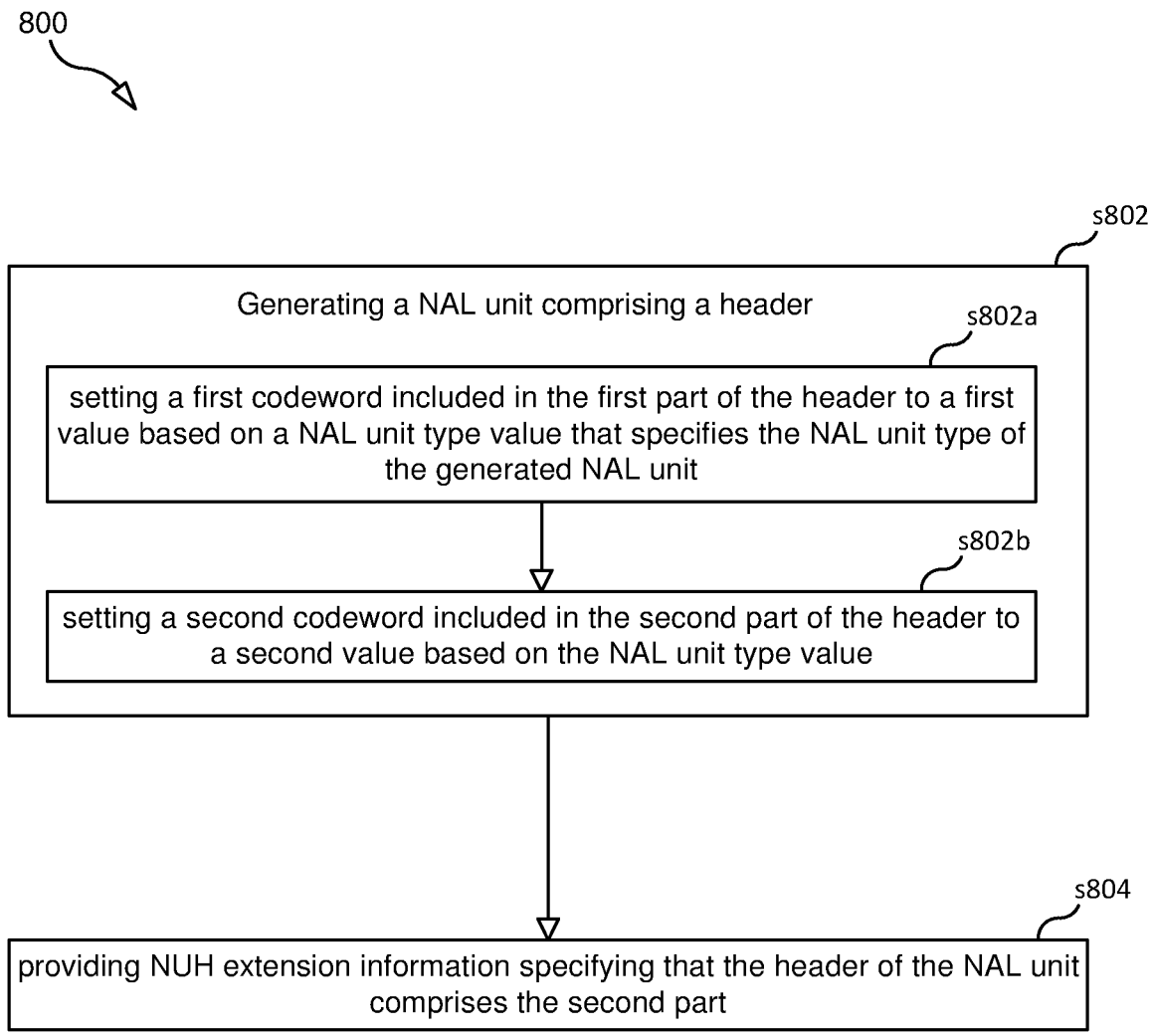
FIG. 8 is a flowchart illustrating an encoding process according to an embodiment.

FIG. 8 is a flowchart illustrating a process 800 that the encoder according to one embodiment may perform to encode a NAL unit. Process 800 may begin with step s802.

Step s802 comprises the encoder generating a network abstraction layer (NAL) unit having a particular NAL unit type, the generated NAL unit comprising a NAL unit header, wherein the NAL unit header comprises a first part and a second part. Generating the NAL unit comprises: i) setting a first codeword included in the first part of the NAL unit header to a first value, nut_lsb, based on a NAL unit type value that specifies the NAL unit type of the generated NAL unit (step s802a) and ii) setting a second codeword included in the second part of the NAL unit header to a second value, nut_ext_bit, based on the NAL unit type value (step s802b).

Step s804 comprises the encoder providing NUH extension information specifying that the NAL unit header of the NAL unit comprises the second part.

In some embodiments, nut_lsb is equal to the value of the N least significant bits of the NAL unit type value, where N is greater than 1, and the second codeword is one bit in length and its value, nut_ext_bit, is set equal to the value of the fourth least significant bit of the NAL unit type value. In some embodiments, generating the NAL unit further comprises setting a third codeword included in the first part of the NAL unit header to a third value, ztrf, and the third codeword is one bit in length and its value is set to the value of the most significant bit of the NAL unit type value. In some embodiments, generating the NAL unit further comprises setting a fourth codeword included in the first part of the NAL unit header to a fourth value, vflag, and the fourth codeword is one bit in length and its value is set to the value of the third least significant bit of the NAL unit type value.

In some embodiments, the NUH extension information specifying that the NAL unit header of the NAL unit comprises the second part is a single bit that is included in the first part of the NAL unit header.

In other embodiments, the NUH extension information specifying that the NAL unit header of the NAL unit comprises the second part is not included in the first part of the NAL unit header. In such embodiments, providing the NUH extension information specifying that the NAL unit header of the NAL unit comprises the second part may include signaling the information in a parameter set (e.g., such as DPS, SPS, PPS, VPS), signaling the information in a picture header, signaling the information in a slice header, or signaling the information in an access unit delimiter.

Figure 9:
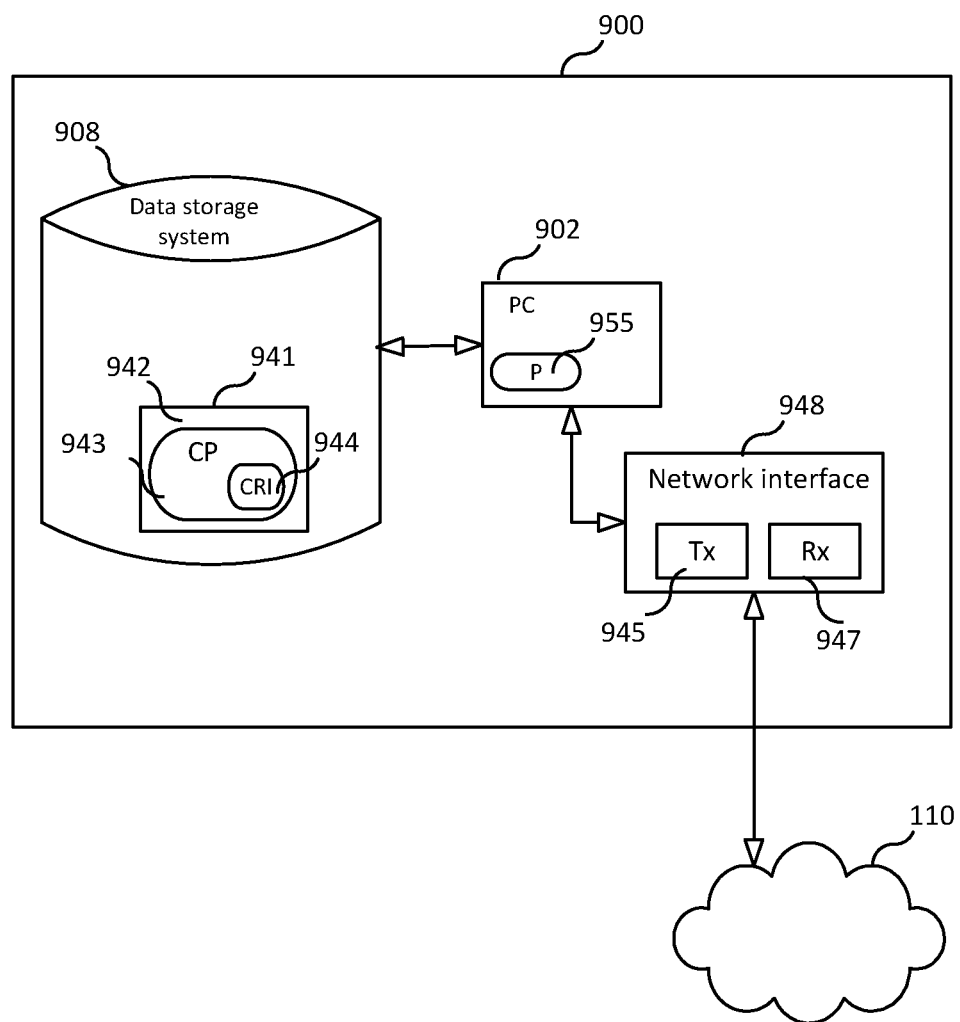
FIG. 9 is a block diagram of an apparatus according to an embodiment.

FIG. 9 is a block diagram of an apparatus 900, according to some embodiments, for implementing the video encoder 140 or the video decoder 260. As shown in FIG. 9, apparatus 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 900 may be a distributed computing apparatus); a network interface 948 comprising a transmitter (Tx) 945 and a receiver (Rx) 947 for enabling apparatus 900 to transmit data to and receive data from other nodes connected to a network 110 (e.g., an Internet Protocol (IP) network) to which network interface 948 is connected (directly or indirectly) (e.g., network interface 948 may be wirelessly connected to the network 110, in which case network interface 948 is connected to an antenna arrangement); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

Figure 10A:
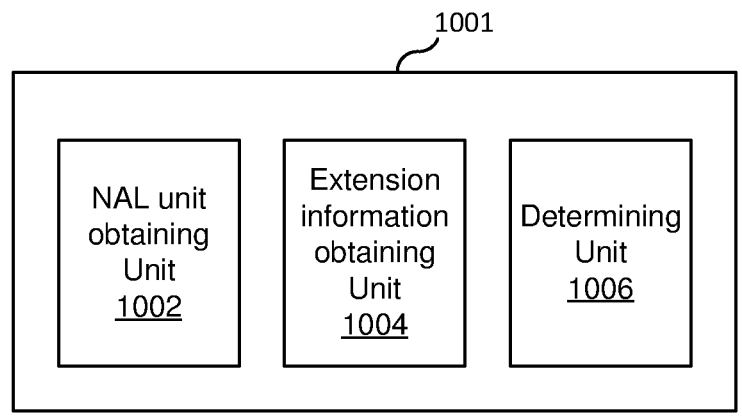
FIG. 10A is a block diagram of a video decoding apparatus according to an embodiment.

FIG. 10A illustrates functional units of a video decoding apparatus 1001 according to an embodiment.

Figure 10B:
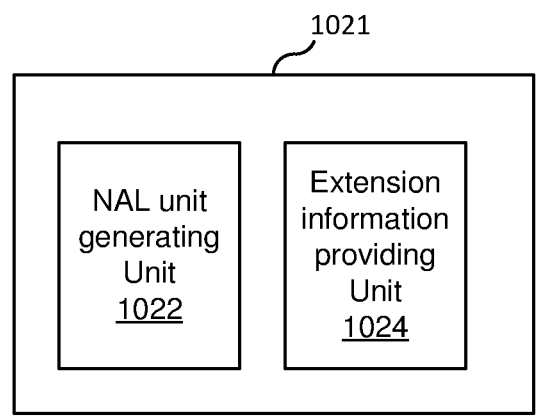
FIG. 10B is a block diagram of a video encoding apparatus according to an embodiment

FIG. 10B illustrates functional units of a video encoding apparatus 1021 according to an embodiment.

Advantages

As noted in the Summary section, an advantage of the above described embodiments is that it is possible to save bits in the NAL unit header by only using a NAL unit header extension for less frequently used NAL unit types. The estimated bitrate savings varies and depends on the application, with varying settings for the overall bitrate, frame rate, and the number of NAL units per picture, where the number of NAL units per picture depends on factors such as the number of slices per picture, if APSs are used, if access unit delimiters are used, additional SEI messages, etc. The estimated bitrate savings for the VVC reference software (VTM-5.0) on the common test conditions (CTC) is shown the tables below.

TABLE 11

All Intra Main10
Over VTM-5.0 with 1 byte NUH

| | Y | U | V |
|---|---|---|---|
| Class A1 | 0.00% | 0.00% | 0.00% |
| Class A2 | 0.00% | 0.00% | 0.00% |
| Class B | −0.01% | −0.01% | −0.01% |
| Class C | −0.02% | −0.02% | −0.02% |
| Class E | −0.02% | −0.02% | −0.02% |
| Overall | −0.01% | −0.01% | −0.01% |
| Class D | −0.05% | −0.05% | −0.05% |
| Class F | −0.02% | −0.02% | −0.02% |

TABLE 12

Random access Main10
Over VTM-5.0 with 1 byte NUH

| | Y | U | V |
|---|---|---|---|
| Class A1 | −0.01% | −0.01% | −0.01% |
| Class A2 | −0.01% | −0.01% | −0.01% |
| Class B | −0.02% | −0.02% | −0.02% |
| Class C | −0.05% | −0.05% | −0.05% |
| Class E | | | |
| Overall | −0.03% | −0.02% | −0.02% |
| Class D | −0.14% | −0.13% | −0.13% |
| Class F | −0.06% | −0.05% | −0.05% |

TABLE 13

Low delay B Main10
Over VTM-5.0 with 1 byte NUH

| | Y | U | V |
|---|---|---|---|
| Class A1 | | | |
| Class F2 | | | |
| Class B | −0.02% | −0.02% | −0.02% |

TABLE 13-continued

Low delay B Main10
Over VTM-5.0 with 1 byte NUH

| | Y | U | V |
|---|---|---|---|
| Class C | −0.04% | −0.04% | −0.04% |
| Class E | −0.19% | −0.16% | −0.16% |
| Overall | −0.07% | −0.06% | −0.06% |
| Class D | −0.11% | −0.09% | −0.09% |
| Class F | −0.11% | −0.10% | −0.10% |

TABLE 14

Low delay P Main10
Over VTM-5.0 with 1 byte NUH

| | Y | U | V |
|---|---|---|---|
| Class A1 | | | |
| Class A2 | | | |
| Class B | −0.02% | −0.02% | −0.02% |
| Class C | −0.04% | −0.04% | −0.04% |
| Class E | −0.19% | −0.15% | −0.16% |
| Overall | −0.07% | −0.06% | −0.06% |
| Class D | −0.10% | −0.08% | −0.09% |
| Class F | −0.11% | −0.10% | −0.09% |

In the CTC, there is always one slice per picture, SEI messages and access unit delimiters are not used and APSs are used for every picture for AI and on average about every third picture for RA, LDB and LDP. This can be seen as a worst-case for the proposed embodiments, but the CTC settings may not be realistic for all common use cases. Below are some estimated bitrate savings for some additional non-CTC use cases:

TABLE 15

| | 4k video streaming 10 Mbps @ 60 fps | 1080p video 2 Mbps @ 60 fps | 4k 360 video 8 Mbps @ 60 fps |
|---|---|---|---|
| Slices per picture | 20 | 5 | 96 |
| SEI messages per picture | 2 | 1 | 2 |
| APSs per picture | 0.33 | 0.33 | 0.33 |
| Bit savings (bits per second): | 10718 | 3038 | 47,198 |
| Bit savings (%) | 0.10 | 0.14 | 0.56 |

While various embodiments are described herein (including the Appendix A), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

APPENDIX A

*This Appendix A contains relevant portions of a contribution that may be submitted for consideration.*

Abstract

This contribution proposes two changes related to the NAL unit header in VVC.

First, it is proposed to signal a flag in the NAL unit header that specifies if the NAL unit header is signaled with one byte or if the NAL unit header is extended with one additional byte. The NAL unit header extension is proposed to be signaled when nuh_layer_id is larger than 0 or when a less common NAL unit type is used (e.g. reserved or unspecified).

More specifically, the following changes to the NAL unit header are proposed in this contribution:
- Signal a vcl_flag indicating whether the NAL unit is a VCL or non-VCL NAL unit
- Signal nal_unit_type_lsb with 2 bits instead of 4
- Signal a nuh_extension_flag specifying whether a 1-byte NAL unit header extension is present
- If the extension is present signal nuh_layer_id, nal_unit_type_ext_bit and nuh_reserved_zero_bit in a second NAL unit header byte, else infer them to be equal to 0
- Signal nuh_layer_id with 6 bits as in HEVC instead of 7 bits
- Set NALUnitType equal to ( zero_tid_required_flag << 4 ) + (vcl_flag << 3 ) + ( nal_unit_type_ext_bit << 2 ) + nal_unit_type_lsb The estimated bit-savings by the change for the CTC are reported to be 0.0%/0.0%/-0.1%/-0.1% for AI/RA/LDB/LDP respectively and the proponents claim higher savings when multiple slices per pictures are used.

Second, in the current VVC draft there are no reserved IRAP NAL unit type values and that the unspecified NAL unit types are required to have temporal ID equal to 0. This contribution proposes to reserve two IRAP NAL unit type values and to allow two of the four unspecified NAL unit types to have a non-zero temporal ID, at the cost of removing two of the reserved non-IRAP NAL unit type values.

1 Introduction

At the JVET meeting in Geneva a NAL unit header design was adopted from JVET-N0067 which assigns a wider range of NUT values while still avoiding MPEG-2 PES start code emulation, eliminating the forbidden_zero_bit and recapturing the bits allocated to temporal ID for NUTs which require temporal ID equal to 0. Further, a layer concept without inter-layer referencing was adopted from JVET-N0278-v3.

The resulting NAL unit header as specified in the VVC draft (JVET-N1001-v7) is signaled using two bytes as shown in the syntax table below.

7.3.1.2 NAL unit header syntax

| nal_unit_header( ) { | Descriptor |
|---|---|
| zero_tid_required_flag | u(1) |
| nuh_temporal_id_plus1 | u(3) |
| nal_unit_type_lsb | u(4) |
| nuh_layer_id | u(7) |
| nuh_reserved_zero_bit | u(1) |
| } | |

It can be expected that for the mainstream usage of the VVC codec, layer ID larger than 0 may not be frequently used and that the second byte of the NAL unit header then most of the time would be equal to 0.

In addition, the draft VVC specification has a capacity of 32 NAL unit types, whereof 18 have been defined and the rest are either reserved or unspecified. Thus, in version 1 of VVC, a large part of the available NAL unit slots may not be allocated.

Accordingly, it would be beneficial to signal the more commonly used information of the NAL unit header with one byte instead of two and signal the less commonly used information, layer ID and rarely used NAL unit types, in a NAL unit header extension.

2 Proposal

This contribution proposes two changes related to the NAL unit header for VVC. These changes are not related to each other and may be considered separately.

2.1 Proposed change 1 – Compact NAL unit header

It is proposed to signal a flag in the NAL unit header that specifies if the NAL unit header is signaled with one byte or if the NAL unit header is extended with one additional byte. The NAL unit header extension is proposed to be signaled when nuh_layer_id is larger than 0 or when a less common NAL unit type is used (e.g. a reserved or unspecified NAL unit type).

More specifically, the following changes to the NAL unit header are proposed in this contribution:

- Signal a vcl_flag indicating whether the NAL unit is a VCL or non-VCL NAL unit
- Signal nal_unit_type_lsb with 2 bits instead of 4
- Signal a nuh_extension_flag specifying whether a 1-byte NAL unit header extension is present
- If the extension is present, signal nuh_layer_id, nal_unit_type_ext_bit and nuh_reserved_zero_bit in a second NAL unit header byte, else infer them to be equal to 0
- Signal nuh_layer_id with 6 bits as in HEVC instead of 7 bits
- Set NALUnitType equal to ( zero_tid_required_flag << 4 ) + ( vcl_flag << 3 ) + ( nal_unit_type_ext_bit << 2 ) + nal_unit_type_lsb
-

2.1.1 Design motivation

The proposal suggests compacting the NAL unit header to one byte in the most common cases instead of two bytes as in the current VVC design. The obvious advantage is bitrate savings which is further discussed in section 0 below.

It can be observed in table 7-1 of the VVC draft that in the current NAL unit header design the first bit of the nal_unit_type_lsb corresponds to whether the NAL unit is a non-VCL NAL unit or if it is a VCL NAL unit or has an unspecified type. We propose to make this property explicit by using an explicit vcl_flag in the NAL unit header. This is purely editorial and does not play a role in compacting the NAL unit header to one byte.

It can also be seen from table 7-1 that when the second bit of nal_unit_type_lsb is set to 1, the NAL unit type is often reserved or unspecified. Thus, this bit is rarely set to 1. We therefore suggest signaling this bit in a NAL unit header extension and use a bit in the first byte of the NAL unit header to indicate if the extension byte is present or not. The NAL unit type can be easily derived by shifting and adding the codewords for zero_tid_required_flag, vcl_flag, nal_unit_type_ext_bit and nal_unit_type_lsb.

In the VVC draft, there are currently 18 specified NAL unit types, 10 NAL unit types reserved for future use and 4 unspecified types. With the proposed design, the order of NAL unit types of table 7-1 results in that all reserved and unspecified values are signaled using two bytes for the NAL unit header. All specified values may be signaled with only one byte in the NAL unit header, except for the APS_NUT and the VPS_NUT which would require that the NAL unit header is signaled with two bytes. It could of course be possible to rearrange the order of the NAL unit types to adjust which NAL unit types that may be signaled with only one byte for the NAL unit header and which ones would require two bytes. For instance, the positions of APS_NUT and AUD_NUT in table 7-1 could be swapped.

A consequence of the proposed design is that the layer ID is signaled with 6 bits as in HEVC, instead of 7 bits as in the current VVC design. The proponents believe that having 63 layer IDs are sufficient for all use cases.

2.1.2 Estimated bitrate savings

It is assessed that in the mainstream usage of the VVC codec the NAL unit type can be signaled with one byte instead of two as in the current version of the VVC draft. Only when nuh_layer_id is larger than 0 or when a less common NAL unit type is used (e.g. reserved or unspecified), the NAL unit header is signaled with two bytes.

The estimated bitrate savings varies and depends on the application, with varying settings for the overall bitrate, frame rate and the number of NAL units per picture, where the number of NAL units per picture depends on factors such as the number of slices per picture, if APSs are used, additional SEI messages, etc. The estimated bitrate savings for VTM-5.0 CTC is shown in Tables 11-14 above. In the estimation, we have swapped the positions of APS_NUT and AUD_NUT in table 7-1 such that the APS NAL unit header is coded with one byte.

Note that there are no losses or noise in these numbers, since the gains do not come from change in quality but purely from saving one byte per NAL unit header. For the Johnny sequence at QP37 in LDB, the bitrate savings are 0.58%.

In the CTC, there is always one slice per picture, SEI messages and access unit delimiters are not used and APSs are used for every picture for AI and on average about every third picture for RA, LDB and LDP. This may not be realistic for all common use cases. Table 15 above shows some estimated bitrate savings for some additional non-CTC use cases.

In JVET-N0051 from Tencent it was also proposed to signal the NAL unit header with one byte instead of two. In that contribution the expected bitrate savings were discussed and estimated for different applications, with estimates ranging from 0.048% to well above 1%.

2.1.3 VVC specification text for proposed change 1

The proposed changes on top of the VVC draft (JVET-N1001-v7) are shown using strikethrough and underlining.

NAL unit header syntax

| nal_unit_header( ) { | Descriptor |
|---|---|
| zero_tid_required_flag | u(1) |
| nuh_temporal_id_plus1 | u(3) |
| <u>vcl_flag</u> | <u>u(1)</u> |
| nal_unit_type_lsb | ~~u(4)~~<u>u(2)</u> |
| <u>nuh_extension_flag</u> | <u>u(1)</u> |
| <u>if nuh_extension_flag {</u> | |
| nuh_layer_id | ~~u(7)~~<u>u(6)</u> |
| <u>nal_unit_type_ext_bit</u> | <u>u(1)</u> |
| nuh_reserved_zero_bit | u(1) |
| <u>}</u> | |
| } | |

NAL unit header semantics

*< The semantics of zero_tid_required_flag and nuh_temporal_id_plus1 are unchanged. >*

<u>vcl_flag equal to 1 indicates that the NAL unit is a VCL NAL unit or that the NAL unit type is unspecified. vcl_flag equal to 0 indicates that the NAL unit is a non-VCL NAL unit.</u> nal_unit_type_lsb specifies the least significant bits for the NAL unit type.

<u>nuh_extension_flag equal to 1 specifies that the NAL unit header has an extension. nuh_extension_flag equal to 0 specifies that there is no NAL unit header extension.</u>

<u>nal_unit_type_ext_bit specifies the extension bit for the NAL unit type. If not present, nal_unit_type_ext_bit is inferred to be equal to 0.</u>

The variable NalUnitType, which specifies the NAL unit type, i.e., the type of RBSP data structure contained in the NAL unit as specified in Table 7-1, is derived as follows:

NalUnitType = ( zero_tid_required_flag << 4 ) + <u>( vcl_flag << 3 ) + ( nal_unit_type_ext_bit << 2 )</u> + nal_unit_type_lsb (7-2)

NAL units that have NalUnitType in the range of UNSPEC28..UNSPEC31, inclusive, for which semantics are not specified, shall not affect the decoding process specified in this Specification.

> NOTE 3 – NAL unit types in the range of UNSPEC28..UNSPEC31 may be used as determined by the application. No decoding process for these values of NalUnitType is specified in this Specification. Since different applications might use these NAL unit types for different purposes, particular care must be exercised in the design of encoders that generate NAL units with these NalUnitType values, and in the design of decoders that interpret the content of NAL units with these NalUnitType values. This Specification does not define any management for these values. These NalUnitType values might only be suitable for use in contexts in which "collisions" of usage (i.e., different definitions of the meaning of the NAL unit content for the same NalUnitType value) are unimportant, or not possible, or are managed – e.g., defined or managed in the controlling application or transport specification, or by controlling the environment in which bitstreams are distributed.

For purposes other than determining the amount of data in the decoding units of the bitstream (as specified in Annex C), decoders shall ignore (remove from the bitstream and discard) the contents of all NAL units that use reserved values of NalUnitType.

> NOTE 4 – This requirement allows future definition of compatible extensions to this Specification.

Table 7-1 – NAL unit type codes and NAL unit type classes

*< Table 7-1 is unchanged >*

> NOTE 5 – A clean random access (CRA) picture may have associated RASL or RADL pictures present in the bitstream.
> NOTE 6 – An instantaneous decoding refresh (IDR) picture having NalUnitType equal to IDR_N_LP does not have associated leading pictures present in the bitstream. An IDR picture having NalUnitType equal to IDR_W_RADL does not have associated RASL pictures present in the bitstream, but may have associated RADL pictures in the bitstream.

nuh_layer_id specifies the identifier of the layer to which a VCL NAL unit belongs or the identifier of a layer to which a non-VCL NAL unit applies. The value of nuh_layer_id shall be in the range of 0 to 62<s>126</s>, inclusive. The value of 63<s>127</s> may be specified in the future by ITU-T | ISO/IEC. For purposes other than determining the amount of data in the decoding units of the bitstream, decoders shall ignore all data that follow the value 63<s>127</s> for nuh_layer_id in a NAL unit.

> NOTE 7 – The value of 63<s>127</s> for nuh_layer_id may be used to indicate an extended layer identifier in a future extension of this Specification.

The value of nuh_layer_id shall be the same for all VCL NAL units of a coded picture. The value of nuh_layer_id of a coded picture is the value of the nuh_layer_id of the VCL NAL units of the coded picture. <u>If not present, the value of nuh_layer_id is inferred to be equal to 0.</u> nuh_reserved_zero_bit shall be equal to '0' <u>when present</u>. The value 1 of nuh_reserved_zero_bit may be specified in the future by ITU-T | ISO/IEC. Decoders shall ignore (i.e. remove from the bitstream and discard) NAL units with nuh_reserved_zero_bit equal to '1'.

2.2 Proposed change 2 – Fix for reserved IRAP and unspecified NAL unit types

In the current VVC draft there are no reserved IRAP NAL unit type values and that all the unspecified NAL unit types are required to have temporal ID equal to 0. This contribution proposes to reserve two IRAP NAL unit type values and to allow two of the four unspecified NAL unit types to have a non-zero temporal ID, at the cost of removing two of the reserved non-IRAP NAL unit type values. The current design and the proposed change are illustrated in the tables below.

NAL unit types 12-15 and 28-31 in the current VVC design.

| NalUnitType | Name of NalUnitType | Description | tID constraints |
|---|---|---|---|
| 12, 13 | RSV_VCL_12 RSV_VCL_13 | Reserved non-IRAP VCL | No constraint |
| 14, 15 | RSV_VCL_14 RSV_VCL_15 | Reserved non-IRAP VCL | No constraint |
| 28, 29 | UNSPEC28 UNSPEC29 | Unspecified non-VCL | tID = 0 |
| 30, 31 | UNSPEC30 UNSPEC31 | Unspecified non-VCL | tID = 0 |

Proposed change for NAL unit types 12-15 and 28-31 in VVC.

| NalUnitType | Name of NalUnitType | Description | tID constraints | Nature of change |
|---|---|---|---|---|
| 12, 13 | RSV_VCL_12 RSV_VCL_13 | Reserved non-IRAP VCL | No constraint | No change |
| 14, 15 | UNSPEC14 UNSPEC15 | Unspecified non-VCL | No constraint | Moved to enable tID > 0 |

| 28, 29 | RSV_VCL_28 RSV_VCL_29 | Reserved IRAP VCL | tID = 0 | Converted from reserved non-IRAP |
|---|---|---|---|---|
| 30, 31 | UNSPEC30 UNSPEC31 | Unspecified non-VCL | tID = 0 | No change |

2.2.1 VVC specification text for proposed change 2

The proposed changes on top of the VVC draft (JVET-N1001-v7) are shown using strikethrough and underlining.

nal_unit_type_lsb specifies the least significant bits for the NAL unit type.

The variable NalUnitType, which specifies the NAL unit type, i.e., the type of RBSP data structure contained in the NAL unit as specified in Table 7-1, is derived as follows:

$$NalUnitType = (zero\_tid\_required\_flag << 4) + nal\_unit\_type\_lsb \quad (7\text{-}2)$$

NAL units that have NalUnitType <u>equal to UNSPEC14, UNSPEC15, UNSPEC30 or UNSPEC31,</u> ~~in the range of UNSPEC28..UNSPEC31, inclusive~~, for which semantics are not specified, shall not affect the decoding process specified in this Specification.

> NOTE 3 – NAL unit types <u>equal to UNSPEC14, UNSPEC15, UNSPEC30 or UNSPEC31</u>~~in the range of UNSPEC28..UNSPEC31~~ may be used as determined by the application. No decoding process for these values of NalUnitType is specified in this Specification. Since different applications might use these NAL unit types for different purposes, particular care must be exercised in the design of encoders that generate NAL units with these NalUnitType values, and in the design of decoders that interpret the content of NAL units with these NalUnitType values. This Specification does not define any management for these values. These NalUnitType values might only be suitable for use in contexts in which "collisions" of usage (i.e., different definitions of the meaning of the NAL unit content for the same NalUnitType value) are unimportant, or not possible, or are managed – e.g., defined or managed in the controlling application or transport specification, or by controlling the environment in which bitstreams are distributed.

For purposes other than determining the amount of data in the decoding units of the bitstream (as specified in Annex C), decoders shall ignore (remove from the bitstream and discard) the contents of all NAL units that use reserved values of NalUnitType.

> NOTE 4 – This requirement allows future definition of compatible extensions to this Specification.

Table 7-1 – NAL unit type codes and NAL unit type classes

| NalUnitType | Name of NalUnitType | Content of NAL unit and RBSP syntax structure | NAL unit type class |
|---|---|---|---|
| 0 | PPS_NUT | Picture parameter set pic_parameter_set_rbsp( ) | non-VCL |

| 1 | AUD_NUT | Access unit delimiter access_unit_delimiter_rbsp( ) | non-VCL |
|---|---|---|---|
| 2 3 | PREFIX_SEI_NUT SUFFIX_SEI_NUT | Supplemental enhancement information sei_rbsp( ) | non-VCL |
| 4 | APS_NUT | Adaptation parameter set adaptation_parameter_set_rbsp( ) | non-VCL |
| 5..7 | RSV_NVCL5.. RSV_NVCL7 | Reserved | non-VCL |
| 8 | TRAIL_NUT | Coded slice of a non-STSA trailing picture slice_layer_rbsp( ) | VCL |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12..13~~15~~ | RSV_VCL_12.. RSV_VCL_13~~15~~ | Reserved non-IRAP VCL NAL unit types | VCL |
| <u>14..15</u> | <u>UNSPEC14 UNSPEC15</u> | <u>Unspecified</u> | <u>non-VCL</u> |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |

| 21..23 | RSV_NVCL21.. RSV_NVCL23 | Reserved | non-VCL |
|---|---|---|---|
| 24<br>25 | IDR_W_RADL<br>IDR_N_LP | Coded slice of an IDR picture<br>slice_layer_rbsp( ) | VCL |
| 26 | CRA_NUT | Coded slice of a CRA picture<br>slice_layer_rbsp( ) | VCL |
| 27 | GRA_NUT | Coded slice of a gradual random access picture<br>slice_layer_rbsp( ) | VCL |
| <u>28..29</u> | <u>RSV_VCL_28</u><br><u>RSV_VCL_29</u> | <u>Reserved IRAP VCL NAL unit types</u> | <u>VCL</u> |
| <u>30</u>28..31 | UNSPEC<u>30</u>28..<br>UNSPEC31 | Unspecified | non-VCL |

...

Order of NAL units and coded pictures and their association to access units

...

- NAL units with NalUnitType <u>equal to UNSPEC14, UNSPEC15, UNSPEC30 or UNSPEC31,</u> ~~in the range of UNSPEC28..UNSPEC29~~ (when present).

...

- When any DPS NAL units, VPS NAL units, SPS NAL units, PPS NAL units, APS NAL units, prefix SEI NAL units, NAL units with NalUnitType equal to RSV_NVCL_5, RSV_NVCL_6, RSV_NVCL_21, or RSV_NVCL_22, or NAL units with NalUnitType <u>equal to UNSPEC14, UNSPEC15, UNSPEC30 or UNSPEC31,</u> ~~in the range of UNSPEC28..UNSPEC29~~ are present, they shall not follow the last VCL NAL unit of the access unit.

...

The invention claimed is:

1. A method performed by a video decoder, the method comprising:
   obtaining a network abstraction layer (NAL) unit having a particular NAL unit type, the obtained NAL unit comprising a NAL unit header, the NAL unit header of the obtained NAL unit comprising at least a first part comprising N bits;
   obtaining NAL unit header (NUH) extension information that indicates whether or not the NAL unit header further comprises a second part that comprises M bits; and
   determining a NAL unit type value specifying the particular NAL unit type of the obtained NAL unit based on a first codeword included in the first part of the NAL unit header, a second codeword included in the second part of the NAL unit header, and a third codeword included in the first part of the NAL unit header.

2. The method of claim 1, wherein determining the NAL unit type value comprises:
   determining that the NUH extension information indicates that the obtained NAL unit further comprises the second part; and
   the NAL unit type value is determined as a result of determining that the NUH extension information indicates that the obtained NAL unit further comprises the second part.

3. The method of claim 2, wherein determining the NAL unit type value comprises:
   calculating the NAL unit type value using the first codeword, the second codeword, and the third codeword.

4. The method of claim 2, wherein determining the NAL unit type value comprises:
   calculating the NAL unit type value using the first codeword included in the first part of the NAL unit header, the second codeword included in the second part of the NAL unit header, the third codeword included in the first part of the NAL unit header, and a fourth codeword included in the first part of the NAL unit header.

5. The method of claim 2, wherein determining the NAL unit type value comprises:
   calculating the NAL unit type value using the first codeword included in the first part of the NAL unit header, the second codeword included in the second part of the NAL unit header, the third codeword included in the first part of the NAL unit header, a fourth codeword included in the first part of the NAL unit header, and the least significant bit of a fifth codeword included in the first part of the NAL unit header.

6. The method of claim 1, wherein the NAL unit type value is calculated as:

$cw1*2A+cw2*2B+cw3*2C$, wherein
   cw1 is the value of the first codeword,
   cw2 is the value of the second codeword,
   cw3 is the value of the third codeword,
   and A, B and C are integer numbers equal to or larger than 0.

7. The method of claim 6, wherein the NAL unit type is calculated as:

$ztrf*24+msb\text{-}nut\_lsb*23+nut\_ext\_bit*22+lsb\text{-}nut\_lsb$, wherein
   ztrf is the value of the third codeword and the third codeword consists of a single bit,
   msb-nut_lsb is the most significant bit of the first codeword and the first codeword consists of three bits,
   nut_ext_bit is the value of the second codeword and the second codeword consists of a single bit, and
   lsb-nut_lsb is the two least significant bits of the first codeword.

8. The method of claim 1, wherein obtaining the NUH extension information comprises obtaining the NUH extension information from the first part of the NAL unit header.

9. The method of claim 8, wherein the NUH extension information consists of the value of a single bit included in the first part of the NAL unit header.

10. The method of claim 1, wherein obtaining the NUH extension information comprises obtaining the NUH extension information based on a specified profile, tier, or level.

11. The method of claim 1, wherein the second codeword is at least 5 bits in length.

12. A method performed by a video encoder, the method comprising:
    generating a network abstraction layer (NAL) unit having a particular NAL unit type, the generated NAL unit comprising a NAL unit header, wherein the NAL unit header comprises a first part and a second part; and
    providing NAL unit header (NUH) extension information specifying that the NAL unit header of the NAL unit comprises the second part, wherein
    generating the NAL unit comprises:
    setting a first codeword included in the first part of the NAL unit header to a first value, nut_lsb, based on a NAL unit type value that specifies the NAL unit type of the generated NAL unit;
    setting a second codeword included in the second part of the NAL unit header to a second value, nut_ext_bit, based on the NAL unit type value; and
    setting a third codeword included in the first part of the NAL unit header to a third value, ztrf.

13. The method of claim 12, wherein
    nut_lsb is equal to the value of the N least significant bits of the NAL unit type value, where N is greater than 1, and
    the second codeword is one bit in length and its value, nut_ext_bit, is set equal to the value of the fourth least significant bit of the NAL unit type value.

14. The method of claim 13, wherein
    the third codeword is one bit in length and its value is set to the value of the most significant bit of the NAL unit type value.

15. A video decoder, the video decoder comprising:
    processing circuitry; and
    a storage medium storing instructions that, when executed by the processing circuitry, cause the video decoder to:
    obtain a network abstraction layer (NAL) unit having a particular NAL unit type, the obtained NAL unit comprising a NAL unit header, the NAL unit header of the obtained NAL unit comprising at least a first part comprising N bits;
    obtain NAL unit header (NUH) extension information that indicates whether or not the NAL unit header further comprises a second part that comprises M bits; and
    determine a NAL unit type value specifying the particular NAL unit type of the obtained NAL unit based on a first codeword included in the first part of the NAL unit header, a second codeword included in the second part of the NAL unit header, and a third codeword included in the first part of the NAL unit header.

16. A video encoder, the video encoder comprising:
processing circuitry; and
a storage medium storing instructions that, when executed by the processing circuitry, cause the video encoder to:
generate a network abstraction layer (NAL) unit having a particular NAL unit type, the generated NAL unit comprising a NAL unit header, wherein the NAL unit header comprises a first part and a second part; and
provide NAL unit header (NUH) extension information specifying that the NAL unit header of the NAL unit comprises the second part, wherein
generating the NAL unit comprises:
setting a first codeword included in the first part of the NAL unit header to a first value, nut_lsb, based on a NAL unit type value that specifies the NAL unit type of the generated NAL unit;
setting a second codeword included in the second part of the NAL unit header to a second value, nut_ext_bit, based on the NAL unit type value; and
setting a third codeword included in the first part of the NAL unit header to a third value, ztrf.

17. A non-transitory computer readable medium storing instructions which when executed by processing circuitry causes the processing circuitry to perform the method of claim 1.

\* \* \* \* \*